US012683052B2

(12) United States Patent
Do et al.

(10) Patent No.:     US 12,683,052 B2
(45) Date of Patent:        Jul. 14, 2026

(54) ELECTRONIC DEVICE AND OPERATING METHOD THEREFOR

(71) Applicant: Samsung Electronics Co., Ltd., Suwon-si (KR)

(72) Inventors: Yonggu Do, Suwon-si (KR); Kookheon Kim, Suwon-si (KR); Heebong Kim, Suwon-si (KR); Jaehoo Park, Suwon-si (KR); Sanghoon Eum, Suwon-si (KR); Joowhan Lee, Suwon-si (KR); Sangkyun Im, Suwon-si (KR); Dosung Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 342 days.

(21) Appl. No.: 18/234,568

(22) Filed: Aug. 16, 2023

(65) Prior Publication Data

US 2023/0395297 A1     Dec. 7, 2023

Related U.S. Application Data

(63) Continuation of application No. PCT/KR2022/001648, filed on Jan. 28, 2022.

(30) Foreign Application Priority Data

Feb. 16, 2021     (KR) ........................ 10-2021-0020689

(51) Int. Cl.
*H01F 7/02*        (2006.01)
*F16M 13/02*       (2006.01)
*H04N 5/655*       (2006.01)

(52) U.S. Cl.
CPC ........... *H01F 7/0252* (2013.01); *F16M 13/02* (2013.01); *H04N 5/655* (2013.01)

(58) Field of Classification Search
CPC .... H01F 7/0252; H01F 2007/208; H01F 7/04; H01F 7/02; H01F 7/06; F16M 13/02;
(Continued)

(56) References Cited

U.S. PATENT DOCUMENTS 8,824,166 B2     9/2014   Rohrbach
8,970,334 B2     3/2015   Choi
(Continued)

FOREIGN PATENT DOCUMENTS

CN         211146032 U      7/2020
JP         2007-335929      12/2007
(Continued)

OTHER PUBLICATIONS https://www.youtube.com/watch?v=53p6lfedO88, published Apr. 16, 2017.
(Continued)

*Primary Examiner* — Sreeya Sreevatsa
(74) *Attorney, Agent, or Firm* — STAAS & HALSEY LLP

(57)        ABSTRACT

An electronic apparatus including a coupler attachable to and detachable from a support which is to support the electronic apparatus, the coupler being arrangeable on a rear surface of the electronic apparatus, a memory to store at least one instruction, and a processor configured to execute the at least one instruction stored in the memory to control a current applied to a magnetic energy control magnet included in one of the coupler and the support such that the coupler is attached to or detached from the support.

13 Claims, 17 Drawing Sheets

(58) Field of Classification Search
CPC .. F16M 2200/08; F16M 11/041; F16M 11/08; F16M 11/10; H04N 5/655; H04N 5/64; G06F 1/1601
USPC ........................................................ 361/147
See application file for complete search history.

(56) References Cited

U.S. PATENT DOCUMENTS

| | | | |
|---|---|---|---|
| 2013/0135067 A1 | 5/2013 | Choi | |
| 2013/0263431 A1 | 10/2013 | Sarh et al. | |
| 2016/0348832 A1* | 12/2016 | Yoo ........................ F16M 13/02 |
| 2017/0202097 A1 | 7/2017 | Lee et al. | |
| 2018/0311795 A1* | 11/2018 | Morton ................ B23Q 3/1546 |
| 2020/0194539 A1* | 6/2020 | Kim ...................... G06F 3/1446 |
| 2020/0196462 A1 | 6/2020 | Kim et al. | |
| 2020/0221593 A1* | 7/2020 | Wang ................... F16M 11/041 |
| 2022/0140064 A1 | 5/2022 | Kim et al. | |
| 2023/0193450 A1 | 6/2023 | Kim et al. | |

FOREIGN PATENT DOCUMENTS

| | | | | |
|---|---|---|---|---|
| KR | 1999-0030621 | | 7/1999 | |
| KR | 10-2004-0029576 | | 4/2004 | |
| KR | 20040029576 A | * | 4/2004 | |
| KR | 10-2005-0024649 | | 3/2005 | |
| KR | 10-2008-0019483 | | 3/2008 | |
| KR | 20080019483 A | * | 3/2008 | ............ H04N 5/655 |
| KR | 10-1125280 | | 3/2012 | |
| KR | 10-1319052 | | 10/2013 | |
| KR | 10-2014-0104836 | | 8/2014 | |
| KR | 10-2017-0083280 | | 7/2017 | |
| KR | 101805446 B1 | * | 12/2017 | ............ H01R 13/42 |
| KR | 10-2051604 | | 12/2019 | |
| KR | 10-2020-0051884 | | 5/2020 | |
| KR | 10-2020-0059721 | | 5/2020 | |
| KR | 10-2020-0072789 | | 6/2020 | |

OTHER PUBLICATIONS

PCT/ISA/210 dated May 20, 2022 in International Patent Application No. PCT/KR2022/001648.
PCT/ISA/237 dated May 20, 2022 in International Patent Application No. PCT/KR2022/001648.
Office Action dated Aug. 13, 2025 issued in Korean Application No. 10-2021-0020689.

* cited by examiner (a)

DO YOU WANT TO FIX THE ELECTRONIC
APPARATUS TO THE SUPPORT BY USING THE
MAGNETIC ENERGY CONTROL MAGNET?

YES　　　NO

1300

1310

(b)

DO YOU WANT TO SEPARATE THE ELECTRONIC
APPARATUS  FROM THE SUPPORT BY USING
THE MAGNETIC ENERGY CONTROL MAGNET?

YES　　　NO

1300

1330

(a)

(b)

ELECTRONIC DEVICE AND OPERATING METHOD THEREFOR

CROSS-REFERENCE TO RELATED APPLICATION

This application is a continuation application, under 35 U.S.C. § 111(a), of international application No. PCT/KR2022/001648, filed on Jan. 28, 2022, which claims priority under 35 U. S. C. § 119 to Korean Patent Application No. 10-2021-0020689, filed on Feb. 16, 2021, in the Korean Intellectual Property Office, the disclosures of which are incorporated by reference herein in their entireties.

TECHNICAL FIELD

Various embodiments disclosed herein relate to an electronic apparatus and an operating method thereof, and more particularly, to an electronic apparatus which is fixed to or separated from a support by using a magnetic energy control magnet, and an operating method thereof.

BACKGROUND ART

In order to fix an electronic apparatus such as a television to a wall surface, a mount should be installed on the wall surface, and the electronic apparatus should be fixed to the mount.

However, not only is it cumbersome to use bolts to fix the electronic apparatus to the mount, but once the electronic apparatus is fixed, it is not easy to separate the electronic apparatus from the mount or adjust the position of the electronic apparatus.

Therefore, there is need for a technology capable of more conveniently and quickly fixing an electronic apparatus to a wall surface or a stand and easily separating the electronic apparatus from the wall surface or the stand.

DISCLOSURE

Technical Solution

An electronic apparatus according to an embodiment may include a coupler detachable/attachable from/to a support for supporting the electronic apparatus and located on a rear surface of the electronic apparatus, a memory storing at least one instruction, and a processor configured to execute the at least one instruction stored in the memory to control a current applied to a magnetic energy control magnet included in one of the coupler and the support such that the coupler is coupled to or detached from the support.

DESCRIPTION OF DRAWINGS

FIGS. 6(a) and 6(b) illustrate cases where an electronic apparatus includes a plurality of couplers, according to an embodiment.

MODE FOR INVENTION

Figures 1A, 1B, 1C:
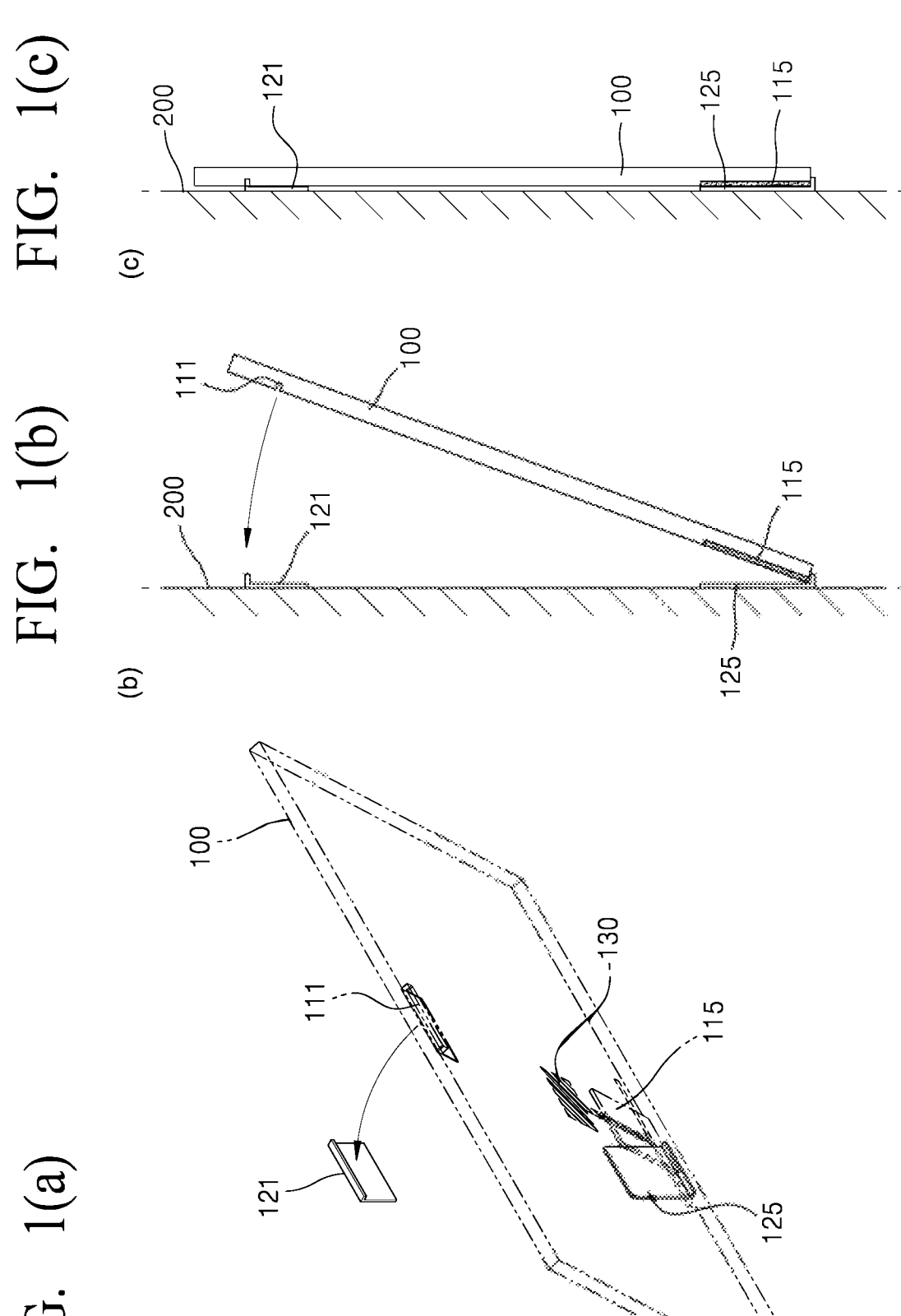
FIGS. 1(a)-1(c) is a diagram for describing attachment/detachment of an electronic apparatus to/from a support by using a magnetic energy control magnet, according to an embodiment.

In an embodiment, the other one of the coupler and the support, which does not include the magnetic energy control magnet, may include a magnetic material, and the processor may be further configured to execute the at least one instruction to control the current to be applied to the magnetic energy control magnet to allow a magnetic path of the magnetic energy control magnet to pass through the magnetic material such that the coupler is attached to the support or prevent the magnetic path from passing through the magnetic material such that the coupler is detached from the support.

In an embodiment, the support may include the magnetic energy control magnet and a first connector, the coupler may include a second connector to be engaged with the first connector, and the electronic apparatus may apply the current to the magnetic energy control magnet through the second connector and the first connector.

In an embodiment, the second connector may sense whether the second connector is coupled with the first connector, and the processor may be further configured to execute the at least one instruction to control the current applied to the magnetic energy control magnet in a case where the second connector senses the coupling with the first connector.

In an embodiment, the electronic apparatus may further include a display and a user input unit, and the processor may be further configured to execute the at least one instruction to control the display to output an interface screen for control signal generation, generate a control signal according to a user input received through the user input unit, corresponding to the interface screen output, and control a direction of a magnetic path of the magnetic energy control magnet by controlling the current applied to the magnetic energy control magnet according to the control signal.

In an embodiment, the coupler may include a first coupler and a second coupler arranged on the rear surface of the electronic apparatus in one of a horizontal direction or a vertical direction, the first coupler and the second coupler may be detached/attached from/to a first support and a second support included in the support by using a first magnetic energy control magnet and a second magnetic energy control magnet, respectively, and the processor may be further configured to execute the at least one instruction to control each of a current applied to the first magnetic energy control magnet and a current applied to the second magnetic energy control magnet.

In an embodiment, one of the coupler and the support may have a hinge structure, the electronic apparatus may further include a user input unit, and the processor may be further configured to execute the at least one instruction to control one of the first coupler and the second coupler to be attached to a corresponding support and control the other one to be detached from a corresponding support according to a rotation direction of the electronic apparatus received through the user input unit.

In an embodiment, the coupler may include the magnetic energy control magnet and a first fastener that moves along a magnetic path of the magnetic energy control magnet, the support may include a second fastener to be coupled with the first fastener, and the processor may be further configured to execute the at least one instruction to control the movement of the first fastener by using the current to be applied to the magnetic energy control magnet such that the coupler is coupled to or detached from the support.

In an embodiment, the magnetic energy control magnet may include a permanent magnet, a first pole piece in contact with an N pole of the permanent magnet, and a second pole piece in contact with an S pole of the permanent magnet, the first fastener may include a first hook and a second hook, each including a magnetic material, the first hook and the second hook may be rotatably arranged at a lower end of the first pole piece and a lower end of the second pole piece, the second fastener may include a left fastener and a right fastener that are caught in a case where the first hook and the second hook respectively move to a left edge and a right edge, the processor may be further configured to execute the at least one instruction to control the current applied to the magnetic energy control magnet to control the first fastener to be coupled to the second fastener or to be detached from the second fastener, and the controlling of the first fastener to be coupled to the second fastener or to be detached from the second fastener may include at least one of preventing the first hook and the second hook from being caught on the left fastener and the right fastener by preventing magnetic force from being formed at the lower end of the first pole piece and the lower end of the second pole piece, and allowing the first hook and the second hook to respectively move to the left edge and the right edge and be caught on the left fastener and the right fastener to be coupled to the support by allowing the magnetic force to be formed at the lower end of the first pole piece and the lower end of the second pole piece.

In an embodiment, the second pole piece may be arranged apart from the first pole piece, the magnetic energy control magnet may further include a rotating magnet rotatably arranged between the first pole piece and the second pole piece, the processor may be further configured to execute the at least one instruction to control the current applied to the magnetic energy control magnet to rotate the rotating magnet to control first fastener to be coupled to the second fastener or to be detached from the second fastener, and the controlling of the first fastener to be coupled to the second fastener or to be detached from the second fastener may include at least one of allowing the first hook and the second hook to be detached from the left fastener and the right fastener by preventing the magnetic force from being formed at the lower end of the first pole piece and the lower end of the second pole piece by allowing the first pole piece and an S pole of the rotating magnet to be magnetically connected and allowing the second pole piece and an N pole of the rotating magnet to be magnetically connected, and allowing the first hook and the second hook to be coupled to the left fastener and the right fastener by allowing the magnetic force to be formed at the lower end of the first pole piece and the lower end of the second pole piece by allowing the first pole piece and the N pole of the rotating magnet to be magnetically connected and allowing the second pole piece and the S pole of the rotating magnet to be magnetically connected.

An operating method performed by an electronic apparatus including a coupler detachable/attachable from/to a support for supporting the electronic apparatus and located on a rear surface of the electronic apparatus, according to an embodiment, may include controlling the coupler to be coupled to or detached from the support by controlling a current to be applied to a magnetic energy control magnet included in one of the coupler and the support, and the controlling of the coupler to be coupled to or detached from the support may include at least one of allowing the coupler to be coupled to the support by applying a first current to the magnetic energy control magnet, and allowing the coupler to be detached from the support by applying a second current to the magnetic energy control magnet.

A computer-readable recording medium according to an embodiment has recorded thereon a program for executing an operating method of an electronic apparatus, wherein the electronic apparatus includes a coupler detachable/attachable from/to a support for supporting the electronic apparatus and located on a rear surface of the electronic apparatus, the method includes controlling the coupler to be coupled to or detached from the support by controlling a current applied to a magnetic energy control magnet included in one of the coupler and the support, and the controlling of the coupler to be coupled to or detached from the support includes at least one of allowing the coupler to be coupled to the support by applying a first current to the magnetic energy control magnet, and allowing the coupler to be detached from the support by applying a second current to the magnetic energy control magnet.

Hereinafter, an embodiment of the present disclosure will be described in detail with reference to the accompanying drawings to allow those of ordinary skill in the art to easily carry out the embodiment of the present disclosure. However, the present disclosure may be implemented in various forms, and is not limited to the embodiment described herein.

Although terms used in the present disclosure are described as general terms currently used under the consideration of functions described in the present disclosure, the terms may refer to various other terms according to the intention of those of ordinary skill in the art, judicial precedents, or introduction of new technology. Therefore, terms used in the present disclosure should not be interpreted only as the names of the terms but as the meaning of the terms and the contents throughout the present disclosure.

In addition, the terms used in the present disclosure are merely used to describe particular embodiments, and are not intended to limit the present disclosure.

Throughout the specification, when a portion is referred to as being "connected" to another portion, it may be "directly connected" to the other portion or "electrically connected" to the other portion with another element therebetween.

The terms "a" and "an" and "the" and similar referents used in the present specification, especially in the following claims, are to be construed to cover both the singular and the plural. In addition, unless the order of steps for describing a method according to the present disclosure is explicitly specified, the steps described herein may be performed in any suitable order. The present disclosure is not limited to the described order of the steps.

Phrases such as "in some embodiments" or "in an embodiment" appearing in various places in the present specification are not necessarily all referring to the same embodiment.

Some embodiments of the present disclosure may be represented by functional block configurations and various processing steps. Some or all of these functional blocks may be implemented in hardware and/or software configuration of the various number of executing a particular function. For example, functional blocks of the present disclosure may be implemented by one or more microprocessors, or by circuit configurations for a predetermined function. Also, for example, functional blocks of the present disclosure may be implemented in various programming or scripting languages. Functional blocks may be implemented by algorithms executed in one or more processors. In addition, the present disclosure may adopt related-art technology for electronic environment set-up, signal processing, and/or data processing. Terms such as "mechanism", "element", "means" and "configuration" may be used broadly, and are not limited to mechanical and physical configurations.

In addition, the connecting lines, or connectors shown in the various figures presented are intended to represent exemplary functional relationships and/or physical or logical couplings between the various elements. In a practical apparatus, connections between elements may be represented by many alternative or additional functional relationships, physical connections or logical connections.

In addition, terms such as " . . . unit" and "module" described in the specification refer to a unit that processes at least one function or operation, which may be implemented as hardware or software or a combination of hardware and software.

In addition, the term "user" in the specification refers to a person who controls a function or operation of an electronic apparatus and/or a support by using the electronic apparatus and the support, and may include a viewer, a consumer, a manager, or an installation engineer.

Hereinafter, the present disclosure will be described in detail with reference to the accompanying drawings.

FIGS. 1(a)-1(c) are drawings for describing detachment/attachment of an electronic apparatus from/to a support by using a magnetic energy control magnet, according to an embodiment.

Referring to FIGS. 1(a)-1(c), an electronic apparatus 100 may be an electronic device detachable/attachable from/to a support.

In an embodiment, the electronic apparatus 100 may be an image display apparatus. The image display apparatus includes a display and thus may be implemented as various types of electronic devices capable of outputting an input signal. For example, the electronic apparatus 100 may include at least one of a digital television, a desktop, an e-book reader, a laptop personal computer (PC), a netbook computer, a camcorder, a navigation system, a home network system, a security system, and a medical apparatus.

In an embodiment, the electronic apparatus 100 is not limited to an image display apparatus and may include various electronic apparatuses detachable/attachable from/to the support through a current. For example, the electronic apparatus 100 may include one of various electronic devices such as an air conditional, a hot-air blower, an electric fan, an electronic bulletin board, an electronic calendar, an electronic picture frame, and an electronic clock.

The electronic apparatus 100 may be mounted on a fixed surface such as a wall, a ceiling, or a stand through the support. The support is a component used to fix the electronic apparatus 100 to a specific position and may also be referred to as a bracket or a mount. The support may be mounted on a fixed surface and may fix the electronic apparatus 100 to the fixed surface. FIGS. 1(a)-1(c) illustrate a case where the support includes a first support 121 and a second support 125.

In an embodiment, the electronic apparatus 100 may include a coupler for coupling to the support. The coupler may be located on a rear surface of the electronic apparatus 100 and used to fix the electronic apparatus 100 to the support.

FIG. 1(a) is a side view of the electronic apparatus 100 and the support.

FIG. 1(b) and FIG. 1(c) are side elevational views of the support fixed to a wall surface 200 and the electronic apparatus 100 coupled to the support.

Referring to FIG. 1(a), the coupler may include a first coupler 111 located on an upper portion of the rear surface of the electronic apparatus 100 and a second coupler 115 located on a lower portion of the rear surface of the electronic apparatus 100.

The first coupler 111 and the second coupler 115 may be respectively detached/attached from/to the first support 121 and the second support 125.

In FIG. 1(a), the first coupler 111 may be configured as a groove for fixing the upper portion of the electronic apparatus 100 to the first support 121. The first support 121 includes a protrusion and thus may be inserted into the groove of the first coupler 111 and coupled with the first coupler 111.

In an embodiment, the second coupler 115 and the second support 125 may be detached/attached from/to each other by using a magnetic energy control magnet. To this end, one of the second coupler 115 and the second support 125 may include the magnetic energy control magnet. The magnetic energy control magnet may refer to a magnet of which a magnet path changes according to an applied current.

In FIGS. 1(a)-1(c), as an embodiment, a case where the second coupler 115 includes the magnetic energy control magnet is described. However, this is only an embodiment, and the second support 125 other than the second coupler 115 may include the magnetic energy control magnet.

The electronic apparatus 100 may include a power supply 130. Each element of the electronic apparatus 100 may operate by receiving power or a current from the power supply 130. The power supply 130 may include a switched-mode power supply (SMPS). In an embodiment, the power supply 130 may also supply a current to the second coupler 115 including the magnetic energy control magnet.

In an embodiment, the electronic apparatus 100 may control the current applied to the magnetic energy control magnet included in the second coupler 115. The electronic apparatus 100 may allow the magnetic path of the magnetic energy control magnet to be changed by controlling the current applied to the magnetic energy control magnet. The electronic apparatus 100 may control the magnetic path of the magnetic energy control magnet by controlling the polarity of the current supplied from the power supply 130 to the second coupler 115.

In an embodiment, in order to detach/attach the second coupler 115 and the second support 125 from/to each other by using the magnetic energy control magnet, the second support 125 may include a magnetic material for coupling with the magnetic energy control magnet of the second coupler 115.

When the second support 125 includes the magnetic material, the electronic apparatus 100 may allow the magnetic path of the magnetic energy control magnet included in the second coupler 115 to pass through the magnetic material included in the second support 125, such that the second coupler 115 is attached to the second support 125.

Once the magnetic path is formed, the magnetic path of the magnetic energy control magnet is maintained until the magnetic path is changed due to a reason such as application of a current of a different polarity to the magnetic energy control magnet. Therefore, after the second coupler 115 is coupled with the second support 125, the electronic apparatus 100 no longer needs to apply a current to the second coupler 115.

Afterwards, when a user wants to separate the electronic apparatus 100 from a wall surface or the like, the user may control the electronic apparatus 100 to prevent the magnetic path of the magnetic energy control magnet included in the second coupler 115 from passing through the magnetic material included in the second support 125. In this case, since the second coupler 115 is not coupled with the second support 125, the user may easily separate the electronic apparatus 100 from the wall surface of the like.

In another embodiment, a fastener in a physical form, which moves according to the magnetic energy control magnet, may be used instead of the magnetic material to detach/attach the second coupler 115 and the second support 125 from/to each other by using the magnetic energy control magnet.

In this case, the second coupler 115 may further include a first physical fastener operated by the magnetic energy control magnet. In addition, the second support 125 may include a second physical fastener coupled with the first physical fastener.

In an embodiment, the first physical fastener may move along the magnetic path of the magnetic energy control magnet. The electronic apparatus 100 may control the position of the first physical fastener by controlling whether to move the first physical fastener by using the magnetic path of the magnetic energy control magnet included in the second coupler 115. The electronic apparatus 100 may control the first physical fastener to be coupled with or not to be coupled with the second physical fastener included in the second support 125 according to the position of the first physical fastener.

In an embodiment, the user may control the current applied to the magnetic energy control magnet by the electronic apparatus 100 by using a user input unit (not shown). As in (b) of FIG. 1, the user may control the current applied to the magnetic energy control magnet such that the second coupler 115 is coupled with the second support 125. In addition, as in (c) of FIG. 1, the user may allow the first coupler 111 and the first support 121 to be engaged with each other such that the upper portion of the electronic apparatus 100 is fixed.

As such, according to an embodiment, the electronic apparatus 100 may control detachment/attachment between the second coupler 115 and the second support 125 by controlling the magnetic path by using the current applied to the magnetic energy control magnet. Therefore, the user may conveniently attach or separate the electronic apparatus 100 to or from the support without using a tool such as a bolt.

Figure 2A:
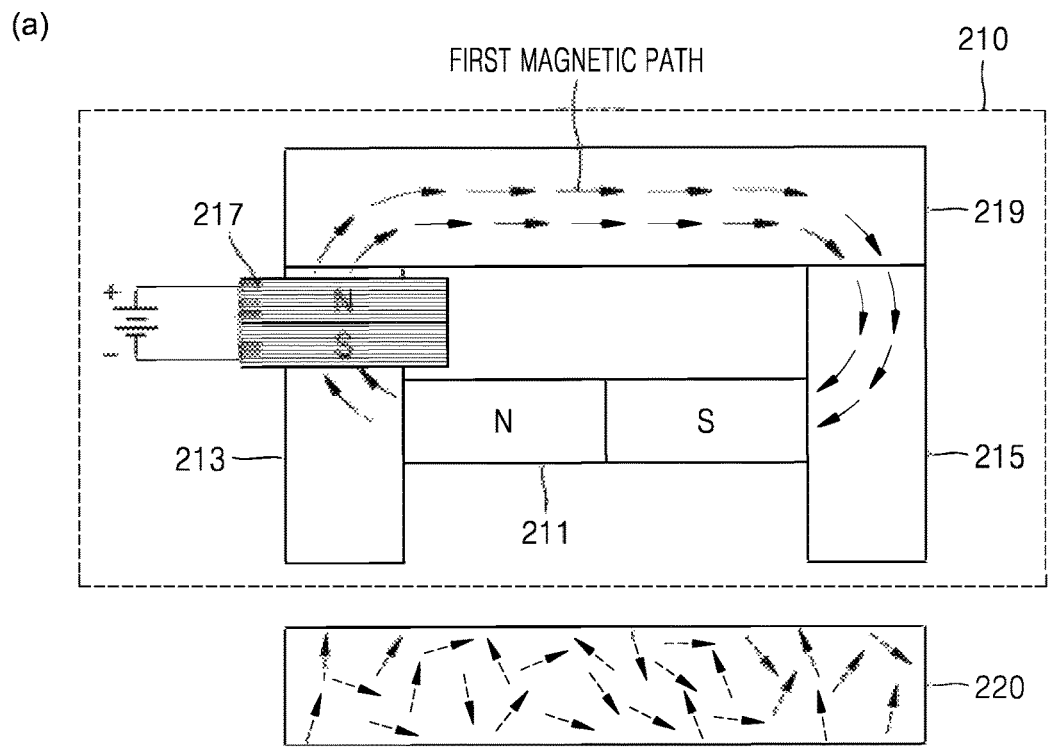
FIGS. 2(a) and 2(b) are diagrams for describing a principle of controlling attachment/detachment between a coupler and a support by controlling a magnetic path of a magnetic energy control magnet, according to an embodiment.
Figure 2B:
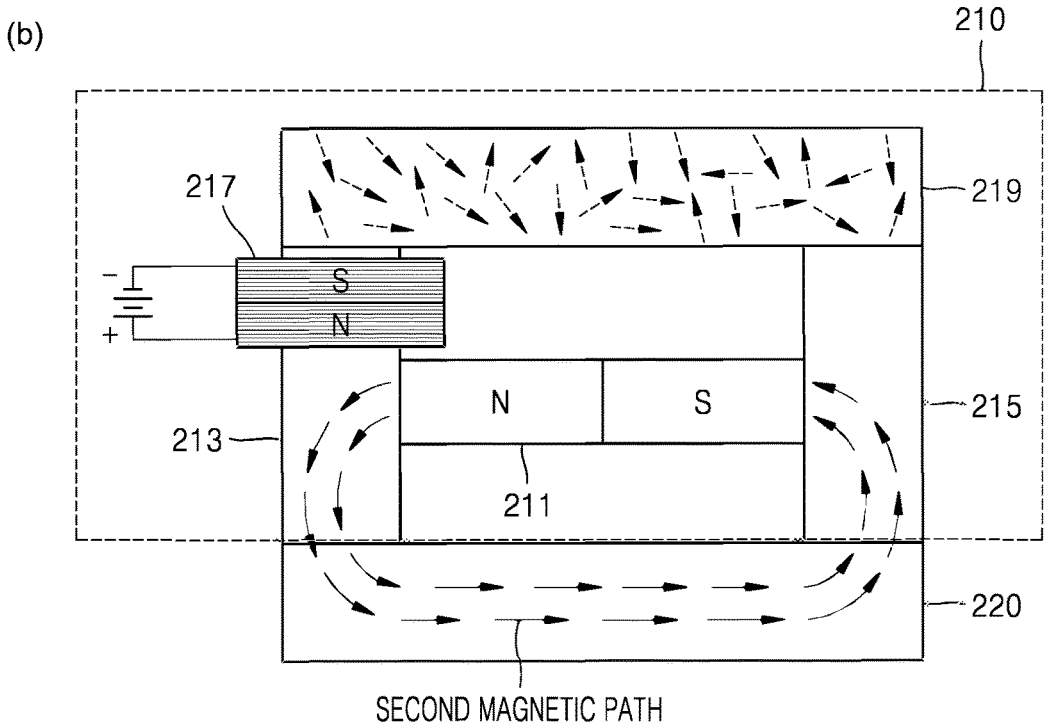

FIGS. 2(a) and 2(b) are diagrams for describing a principle of controlling detachment/attachment between a coupler and a support by controlling a magnetic path of a magnetic energy control magnet, according to an embodiment.

FIG. 2(a) is a diagram for describing that a magnetic energy control magnet 210 and a magnetic material 220 are not coupled with each other according to a magnetic path of the magnetic energy control magnet 210.

Magnets are ferromagnetic materials and may be classified into permanent magnets and electromagnets. The permanent magnets are hard magnetic materials and may refer to magnets that constantly discharge lines of magnetic force even without energy supplied from the outside. In contrast, the electromagnets are soft magnetic materials and are not magnets themselves but may refer to temporary magnets that become magnets when power is applied and lose magnetic force when power is not applied.

In an embodiment, the magnetic energy control magnet 210 may refer to a magnet of which a magnetic path is controlled according to an applied current by using both a permanent magnet and an electromagnet.

Referring to FIG. 2(a), the magnetic energy control magnet 210 may include a permanent magnet 211 and a pole piece supporting the permanent magnet 211. The pole piece may include a ferromagnetic material such as iron. The pole piece may include a first pole piece 213, a second pole piece 215, and a third pole piece 219.

Referring to FIG. 2(a), the first pole piece 213 may be in contact with an N pole of the permanent magnet 211, and the second pole piece 215 may be in contact with an S pole of the permanent magnet 211. In addition, the third pole piece 219 may be arranged at upper ends of the first pole piece 213 and the second pole piece 215.

A current may be applied to the pole piece. FIG. 2(a) illustrates that a coil 217 is wound around the first pole piece 213 and a current is applied to the first pole piece 213. However, this is only an embodiment, and the coil 217 may be wound around at least one of the first to third pole pieces 213, 215, and 219.

In an embodiment, the electronic apparatus 100 may supply a current having a predetermined polarity to the coil 217 such that the first pole piece 213 around which the coil 217 is wound becomes an electromagnet temporarily. For example, according to the polarity of the current, in the first pole piece 213, a portion close to the permanent magnet 211 may become an S pole and a portion far from the permanent magnet 211 may become an N pole. In this case, a first magnetic path from the N pole of the permanent magnet 211 to the S pole thereof is formed.

As in FIG. 2(a), when the first magnetic path is formed, interaction surfaces located at lower ends of the first pole piece 213 and the second pole piece 215 are not polarized. Therefore, the magnetic energy control magnet 210 may not be attached to the magnetic material 220. Once the first magnetic path is formed, the first magnetic path is maintained even when the electronic apparatus 100 no longer supplies a current to the coil 217.

FIG. 2(b) illustrates a case where a current having a polarity different from that in FIG. 2(a) is applied to the coil 217. In an embodiment, as the current having the different polarity is supplied to the coil 217, the portion close to the permanent magnet 211 becomes an N pole and the portion far from the permanent magnet 211 becomes an S pole, in the first pole piece 213 around which the coil 217 is wound. In this case, lines of magnetic force coming from the N pole of the permanent magnet 211 are not formed in a direction of the first magnetic path due to the N pole of the electromagnet formed on the first pole piece 213. In this case, the lower end of the first pole piece 213 has an N-pole polarity, and the lower end of the second pole piece 215 has an S-pole polarity. Since the interaction surfaces located at the lower ends of the first pole piece 213 and the second pole piece 215 are polarized, the magnetic material 220 located near the lower ends of the first pole piece 213 and the second pole piece 215 is attached to the magnetic energy control magnet 210. Therefore, the lines of magnetic force coming from the N pole of the permanent magnet 211 may form a second magnetic path that passes through the magnetic material 220, as shown in FIG. 2(b).

In an embodiment, the magnetic energy control magnet 210 may be included in the coupler of the electronic apparatus 100. In this case, the magnetic material 220 may be included in the support. Alternatively, in another embodiment, the magnetic energy control magnet 210 may be included in the support, and the magnetic material 220 may be included in the coupler. In both cases, the electronic apparatus 100 may control whether the magnetic energy control magnet 210 and the magnetic material 220 are coupled with each other, by controlling a magnetic path by using the polarity of a current applied to the magnetic energy control magnet 210.

Figure 3B:
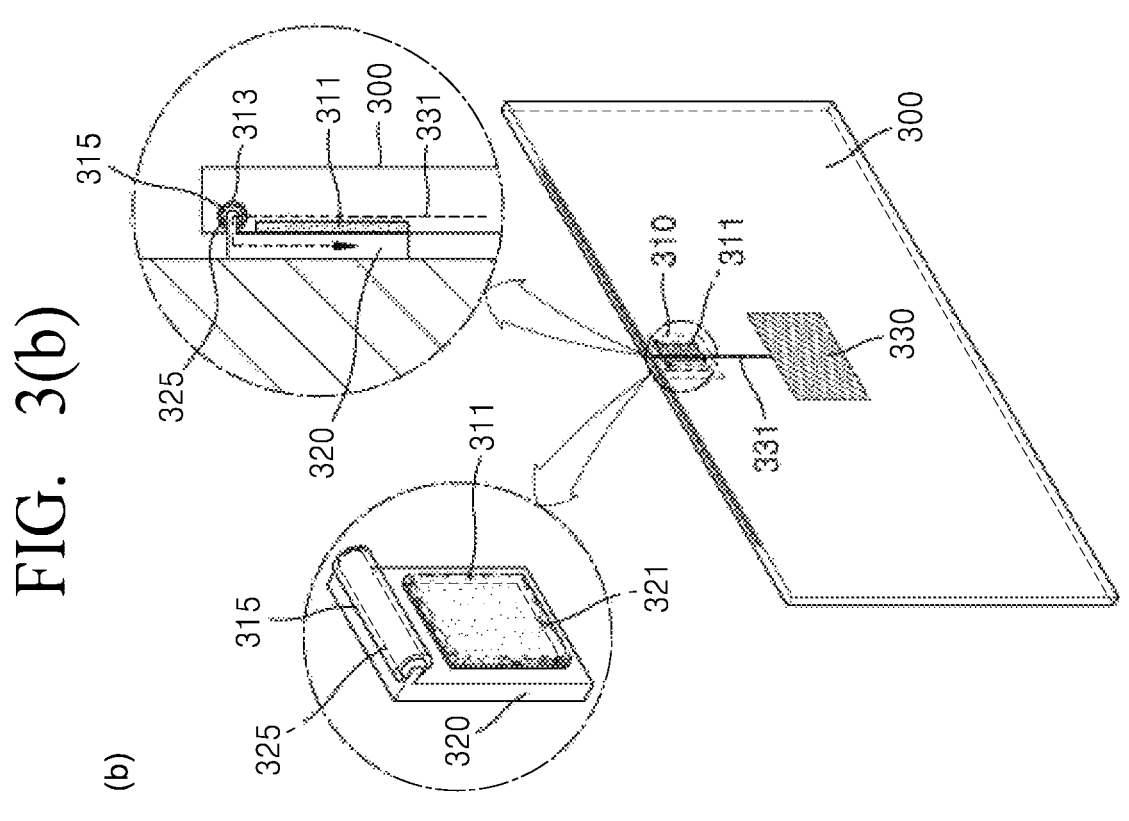
FIGS. 3(a) and 3(b) are diagrams for describing that, when a support includes a magnetic energy control magnet, an electronic apparatus controls a current applied to the magnetic energy control magnet, according to an embodiment.
Figure 3A:
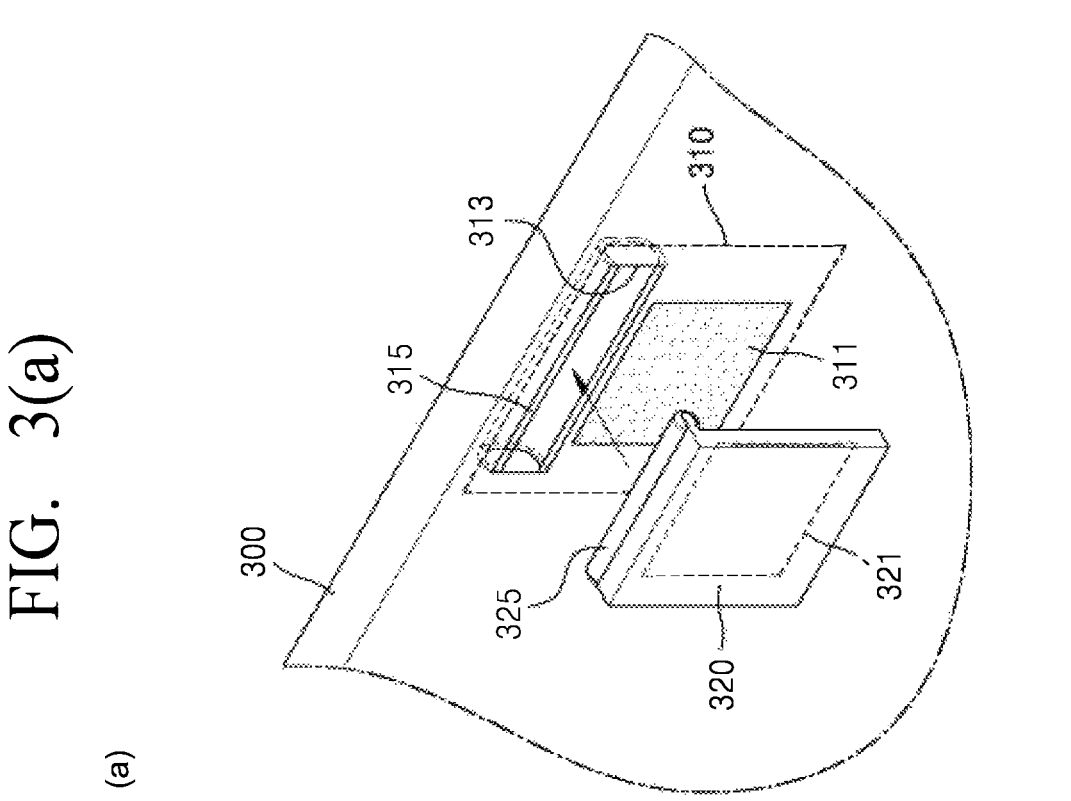

FIGS. 3(a) and 3(b) are diagrams for describing that when a support includes a magnetic energy control magnet, an electronic apparatus controls a current applied to the magnetic energy control magnet, according to an embodiment.

FIG. 3(a) is a diagram illustrating that a coupler 310 is coupled with a support 320, on a rear surface of an electronic apparatus 300.

Referring to FIG. 3(a), the coupler 310 located on the rear surface of the electronic apparatus 300 may include a magnetic material 311 and a groove 313. In addition, a first connector 315 may be mounted in the groove 313.

The support 320 may include a magnetic energy control magnet 321 and a second connector 325.

In an embodiment, the first connector 315 included in the coupler 310 and the second connector 325 included in the support 320 may be engaged and connected with each other. The first connector 315 and the second connector 325 may connect the coupler 310 with the support 320 to allow a current to flow from the coupler 310 to the support 320.

FIG. 3(a) illustrates a case where each of the first connector 315 and the second connector 325 is a pogo pin, as an example. The pogo pin may refer to a cylinder-shaped pin in which a conductor pin is connected to a spring inserted therein. When two male and female pogo pins are engaged with each other, conductor pins included in the pogo pins are in contact with each other and are electrically connected with each other. However, this is only an embodiment, and the first connector 315 and the second connector 325 are not limited to the pogo pins and may be other types of connectors that serve to connect two conductors.

FIG. 3(b) is a diagram illustrating a side surface of the electronic apparatus 300.

Referring to FIG. 3(b), the electronic apparatus 300 may supply a current 331 to the coupler 310 through a power supply 330 such as an SMPS. The current 331 supplied to the coupler 310 may be supplied to the second connector 325 included in the support 320 through the first connector 315.

In an embodiment, as shown in FIGS. 3(a) and 3(b), the first connector 315 and the second connector 325 may be coupled with each other in a mutually perpendicular manner. In other words, while pressing the second connector 325 from top to bottom, the first connector 315 may be coupled with the second connector 325. The current 331 may be applied to the magnetic energy control magnet 321 included in the support 320 through the first connector 315 and the second connector 325.

In an embodiment, the electronic apparatus 300 may sense whether the first connector 315 and the second connector 325 are interconnected. In an embodiment, the first connector 315 may sense whether the first connector 315 is interconnected with the second connector 325.

In an embodiment, when sensing that the first connector 315 and the second connector 325 are interconnected, the electronic apparatus 300 may control a current applied to the magnetic energy control magnet 321 through the first connector 315 and the second connector 325.

In an embodiment, the electronic apparatus 300 may control a current applied to the magnetic energy control magnet 321. The electronic apparatus 300 may control a magnetic path of the magnetic energy control magnet 321 by controlling the polarity of the current applied to the magnetic energy control magnet 321 through the first connector 315 and the second connector 325.

The electronic apparatus 300 may allow the magnetic path of the magnetic energy control magnet 321 to pass through the magnetic material 311 included in the coupler 310 to control the coupler 310 to be coupled to the support 320. Alternatively, the electronic apparatus 300 may prevent the magnetic path of the magnetic energy control magnet 321 from passing through the magnetic material 311 included in the coupler 310 to control the coupler 310 not to be coupled to the support 320.

As such, according to an embodiment, when the coupler 310 of the electronic apparatus 300 includes the magnetic material 311 and the support 320 includes the magnetic energy control magnet 321, the electronic apparatus 300 may apply a current to the magnetic energy control magnet 321 included in the support 320 by using the connectors respectively included in the coupler 310 and the support 320. The electronic apparatus 300 may control detachment/attachment between the coupler 310 and the support 320 by controlling the current applied to the magnetic energy control magnet 321.

Figure 4:
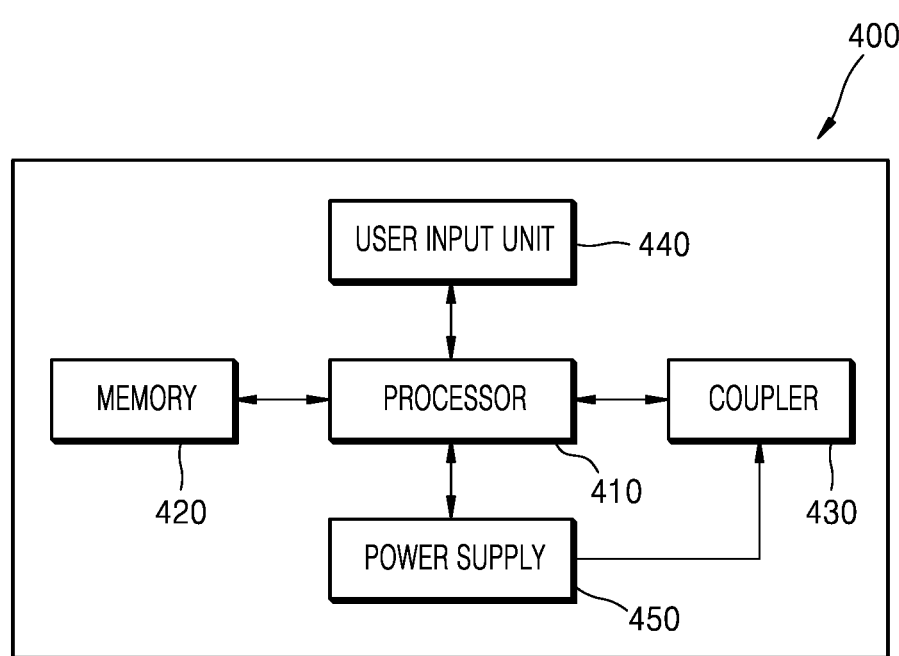
FIG. 4 is an internal block diagram of an electronic apparatus according to an embodiment.

FIG. 4 is an internal block diagram of an electronic apparatus according to an embodiment.

Referring to FIG. 4, an electronic apparatus 400 may include a processor 410, a memory 420, a coupler 430, a user input unit 440, and a power supply 450.

The memory 420 according to an embodiment may store at least one instruction. The memory 420 may store at least one program executed by the processor 410. The memory 420 may store predefined operating rules or programs. In addition, the memory 420 may store data input to the electronic apparatus 400 or output from the electronic apparatus 400.

The memory 420 may include at least one type of storage medium among a flash memory type, a hard disk type, a multimedia card micro type, a card type memory (for example, a secure digital (SD) or an extreme digital (XD) memory), a random-access memory (RAM), a static RAM (SRAM), a read-only memory (ROM), an electrically erasable programmable ROM (EEPROM), a programmable ROM (PROM), a magnetic memory, a magnetic disk, and an optical disk.

The coupler 430 according to an embodiment may be detachably/attachably coupled to a support for supporting the electronic apparatus 400. The coupler 430 is located on a rear surface, side surface, or an upper end surface of the electronic apparatus 400 to fix the electronic apparatus 400 to the support or separate the electronic apparatus 400 from the support.

In an embodiment, one of the coupler 430 and the support that is detached/attached from/to the coupler 430 may include a magnetic energy control magnet.

In an embodiment, when the support includes the magnetic energy control magnet, the coupler 430 may further include a first connector for supplying a current to the support. In this case, the support that is detached/attached from/to the coupler 430 may further include a second connector engaged with the first connector. The first connector of the coupler 430 may be connected to the second connector of the support such that a current applied from the power supply 450 is applied to the magnetic energy control magnet of the support. In an embodiment, the first connector included in the coupler 430 may sense whether the first connector is coupled with the second connector included in the support. In an embodiment, when sensing the coupling between the first connector and the second connector, the processor 410 may control the direction of a magnetic path by controlling the current applied to the magnetic energy control magnet through the first connector and the second connector.

The processor 410 may control the electronic apparatus 400 to function by executing the at least one instruction stored in the memory 420.

In an embodiment, the processor 410 may control the coupler 430 to be coupled to or not to be coupled to the support by controlling a current applied to a magnetic energy control magnet.

In an embodiment, the processor 410 may control detachment/attachment between the coupler 430 and the support by allowing a magnetic path of a magnetic energy control magnet to pass through a magnetic material or not to pass through the magnetic material. To this end, when the coupler 430 includes a magnetic energy control magnet, the support may include a magnetic material for coupling with the magnetic energy control magnet. Alternatively, when the support includes a magnetic energy control magnet, the coupler 430 may include a magnetic material.

In an embodiment, the processor 410 may control a current applied to the magnetic energy control magnet to allow a magnetic path of the magnetic energy control magnet to pass through the magnetic material, such that the coupler 430 is attached to the support.

In an embodiment, the processor 410 may control a current applied to the magnetic energy control magnet to prevent a magnetic path of the magnetic energy control magnet from passing through the magnetic material, such that the coupler 430 is not attached to the support.

In another embodiment, the coupler 430 and the support may be detached/attached from/to each other by using a fastener in a physical form instead of the magnetic material. To this end, one of the coupler 430 and the support may include a physical fastener. For example, the physical fastener may have a structure capable of being coupled with the other fastener by using a structure or shape itself, such as a hook. In addition, the other one of the coupler 430 and the support may have a structure that is engaged and coupled with the physical fastener.

In an embodiment, the physical fastener may have a structure that moves along a magnetic path of a magnetic energy control magnet and thus, changes position. The electronic apparatus 400 may control whether the coupler 430 and the support are coupled with each other by moving the physical fastener to change its position by using the magnetic path of the magnetic energy control magnet included in the coupler 430 or the support.

The user input unit 440 according to an embodiment may receive a user input for controlling the electronic apparatus 400. The user input unit 440 may include various types of user input devices including a touch panel for detecting a touch of a user, a button for receiving a push operation of the user, a wheel for receiving a rotation operation of the user, a keyboard, a dome switch, a microphone for voice recognition, and a motion detection sensor for sensing a motion, but is not limited thereto.

In addition, when the electronic apparatus 400 is operated by a remote controller (not shown), the user input unit 440 may receive a control signal received from the remote controller. The remote controller may control the electronic apparatus 400 by using short-range communication including infrared or Bluetooth. The remote controller may control functions of the electronic apparatus 400 through the user input unit 440 by using at least one of a provided key or button, a touchpad, a microphone capable of receiving a voice of the user, and a sensor capable of recognizing motion of the remote controller.

In an embodiment, the user may control the electronic apparatus 400 through the user input unit 440 such that the coupler 430 is coupled to the support or is not coupled to the support. The user may select whether to allow the coupler 430 to be coupled to the support by controlling the polarity of a current applied to the coupler 430 by using the user input unit 440.

The processor 410 may generate a control signal according to a user input received through the user input unit 440 and may control a current applied to a magnetic energy control magnet according to the control signal to control the direction of a magnetic path of the magnetic energy control magnet.

The power supply 450 according to an embodiment may supply power to the electronic apparatus 400. The power supply 130 may receive commercial power from a power company or may receive power from an auxiliary apparatus. The auxiliary apparatus may include its own generator or an emergency power system such as an uninterruptible power supply or a cell. The cell may include a primary cell that may only be used once, such as dry cells, and a secondary cell that may be recharged and used again. The power supply 450 may supply, to the electronic apparatus 400, power received from the power company or the auxiliary apparatus.

In an embodiment, the processor 410 may control a current provided from the power supply 450 to the coupler 430 to control a magnetic path of a magnetic energy control magnet.

In an embodiment, the power supply 450 may apply a current having a predetermined polarity to the coupler 430 under control by the processor 410.

In an embodiment, the electronic apparatus 400 may include a plurality of couplers 430. The plurality of couplers 430 may be arranged in the electronic apparatus 400 in various forms. For example, the plurality of couplers 430 may be arranged in parallel in the electronic apparatus 400 in one of a horizontal direction and a vertical direction. Alternatively, in the electronic apparatus 400, the plurality of couplers 430 may be arranged at each corner of the electronic apparatus 400. For example, when the electronic apparatus 400 has a rectangular shape, the plurality of couplers 430 may be arranged near four corners of the electronic apparatus 400, respectively.

In an embodiment, when the electronic apparatus 400 includes a plurality of couplers 430, the processor 410 may control a magnetic path of a magnetic energy control magnet included in each of the couplers 430 or a magnetic energy control magnet included in a support corresponding to each of the couplers 430 to independently control detachment/attachment between each coupler 430 and the support.

In an embodiment, two couplers 430 included in the electronic apparatus 400 may be respectively coupled to supports in an angle-adjustable form. For example, one of the coupler 430 and the support may be in a form including a hinge including two surfaces that are folded and unfolded. When the two couplers 430 mounted on the electronic apparatus 400 are arranged in the horizontal direction, wherein one of the two couplers 430 is attached to the support and the other one is separated from the support, the angle of the electronic apparatus 400 may be adjusted to the left or to the right.

Similarly, when the two couplers 430 mounted on the electronic apparatus 400 are arranged in the vertical direction and only one of the two couplers 430 is attached to the support, the angle of the electronic apparatus 400 may be adjusted upwardly or downwardly.

In an embodiment, the user may select an angle adjustment function through the user input unit 440. When the angle adjustment function is selected, the processor 410 may control one of the two couplers 430 to be coupled to the corresponding support and may control the other one to be separated from the corresponding support.

Figure 5:
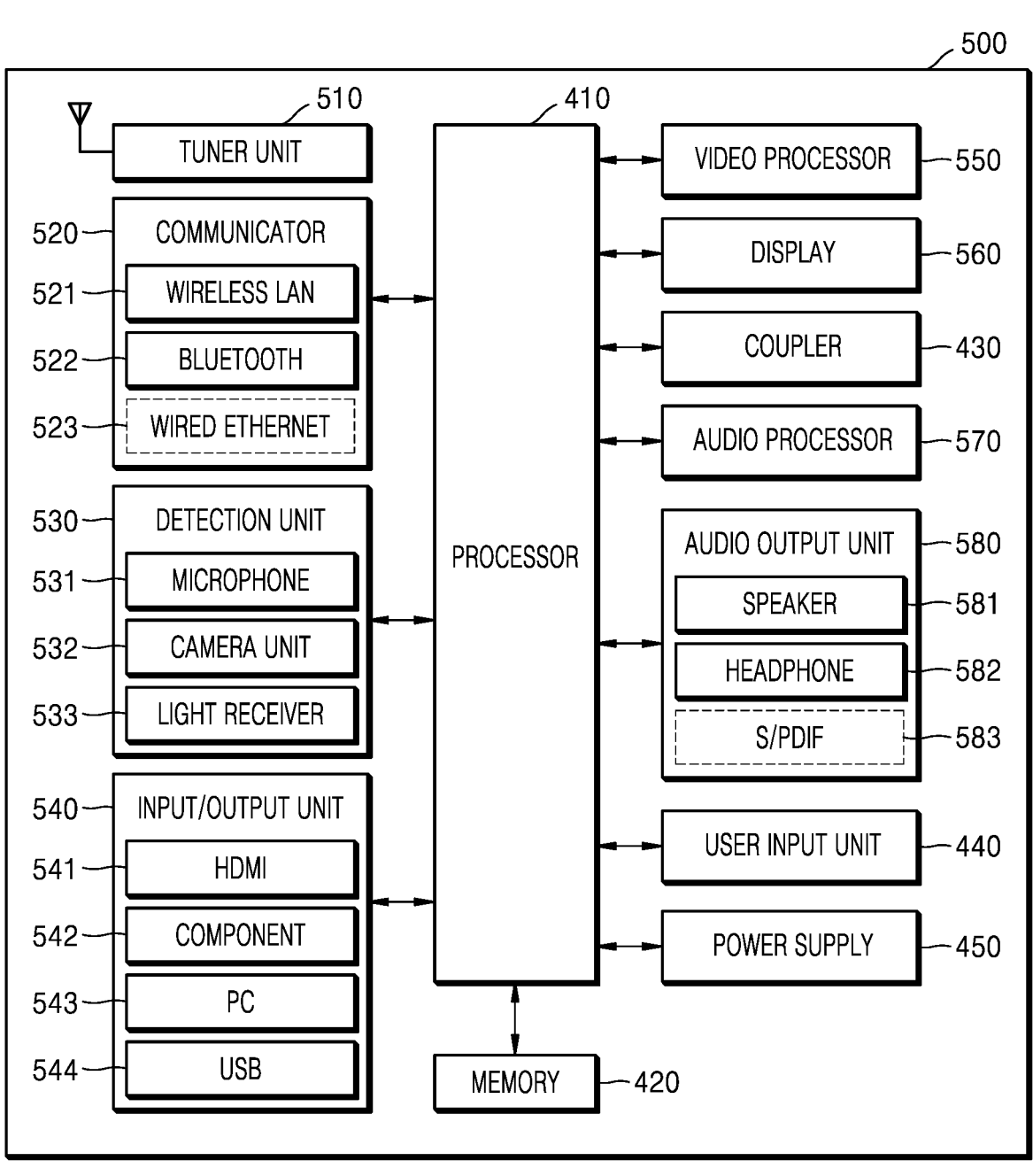
FIG. 5 is an internal block diagram of an electronic apparatus according to an embodiment.

FIG. 5 is an internal block diagram of an electronic apparatus according to an embodiment. An electronic apparatus 500 of FIG. 5 may include elements of the electronic apparatus 400 of FIG. 4. Therefore, the same description as that made with reference to FIG. 4 is omitted.

Referring to FIG. 5, the electronic apparatus 500 may further include a tuner unit 510, ac communicator 520, a detection unit 530, an input/output unit 540, a video processor 550, a display 560, an audio processor 570, and an audio output unit 580, in addition to the processor 410, the memory 420, the coupler 430, the user input unit 440, and the power supply 450.

The tuner unit 510 may tune and select only a frequency of a channel to be received by the electronic apparatus 500 from among many radio wave components through amplification, mixing, and resonance of broadcasting content that is received by wired or wirelessly. Content received through the tuner unit 510 is decoded into an audio, a video, and/or additional information. The audio, video, and/or additional information may be stored in the memory 420 under control by the processor 410.

The communicator 520 may connect the electronic apparatus 500 to a peripheral device, an external apparatus, or a server under control by the processor 410. The communicator 520 may include at least one of wireless LAN 521, Bluetooth 522, and wired Ethernet 524 corresponding to the performance and structure of the electronic apparatus 500.

The communicator 520 may receive a control signal through a control apparatus (not shown) such as a remote control. The control signal may be implemented as a Bluetooth type, a radio frequency (RF) signal type, or a Wi-Fi type. The communicator 520 may further include short-range communication (for example, near-field communication (NFC)) (not shown) in addition to the Bluetooth 522. The Bluetooth 522 may include a Bluetooth low energy (BLE) communication module. The BLE communication module may transmit/receive a signal to/from the control apparatus through a BLE communication scheme.

The detection unit 530 may detect a voice, image, interaction of a user. FIG. 5 illustrates that the detection unit 530 and the user input unit 440 are separate elements, but this is only an embodiment, and the detection unit 530 may be included in the user input unit 440 to receive a user input.

The detection unit 530 may include a microphone 531, a camera unit 532, and a light receiver 533. The microphone 531 may receive a user's uttered voice, may convert the received voice into an electrical signal, and may output the electrical signal to the processor 410. The camera unit 532 may include a sensor (not shown) and a lens (not shown) and may capture an image formed on a screen. The light receiver 533 may receive an optical signal (including a control signal).

The light receiver 533 may receive an optical signal corresponding to a user input (for example, a touch, a press, a touch gesture, a voice, or a motion) from a remote control or a mobile phone. The received optical signal may include a key code instruction corresponding to a key input of the control apparatus. The processor 410 may extract the key code instruction from the optical signal received by the light receiver 533 and may control the electronic apparatus 500 to operate accordingly.

The input/output unit 540 may receive a video (for example, a moving image signal or a still image signal), an audio (for example, a voice signal or a music signal), and additional information such as metadata, from a device outside the electronic apparatus 500, for example, from an external database, a server, or an external terminal, provided by content providers, under control by the processor 410. The metadata may include high-dynamic-range (HDR) information about content, a description or content title for the content, and a content storage position.

The input/output unit 540 may include at least one of a high-definition multimedia interface (HDMI) port 541, a component jack 542, a PC port 543, and a universal serial bus (USB) port 544.

The video processor 550 may process image data to be displayed by the display 560 and may perform various image processing operations such as rendering, noise removal, frame rate conversion, resolution conversion, and scaling, in addition to decoding and resizing, on the image data.

The display 560 may output, on the screen, content received from a broadcasting station or received from an external server, or an external storage medium. The content that is a media signal may include a video signal, an image, or a text signal. When the display 560 is implemented as a touch screen, the display 560 may be used as an input device such as a user interface in addition to an output device. For example, the display 560 may include at least one of a liquid crystal display, a thin film transistor-liquid crystal display, an organic light-emitting diode, a flexible display, a three-dimensional (3D) display, and an electrophoretic display. In addition, according to an implementation type of the display 560, two or more displays 560 may be provided.

The audio processor 570 perform processing on an audio included in content received through the tuner unit 510, an audio input through the communicator 520 or the input/output unit 540, or an audio stored in the memory 420. The audio processor 570 may perform various processing operations such as decoding, amplification, or noise removal on audio data.

The audio output unit 580 may output the audio processed by the audio processor 570. The audio output unit 580 may include at least one of a speaker 581, a headphone output terminal 582, and a Sony/Philips digital interface (S/PDIF) output terminal 583.

Figures 6A, 6B:
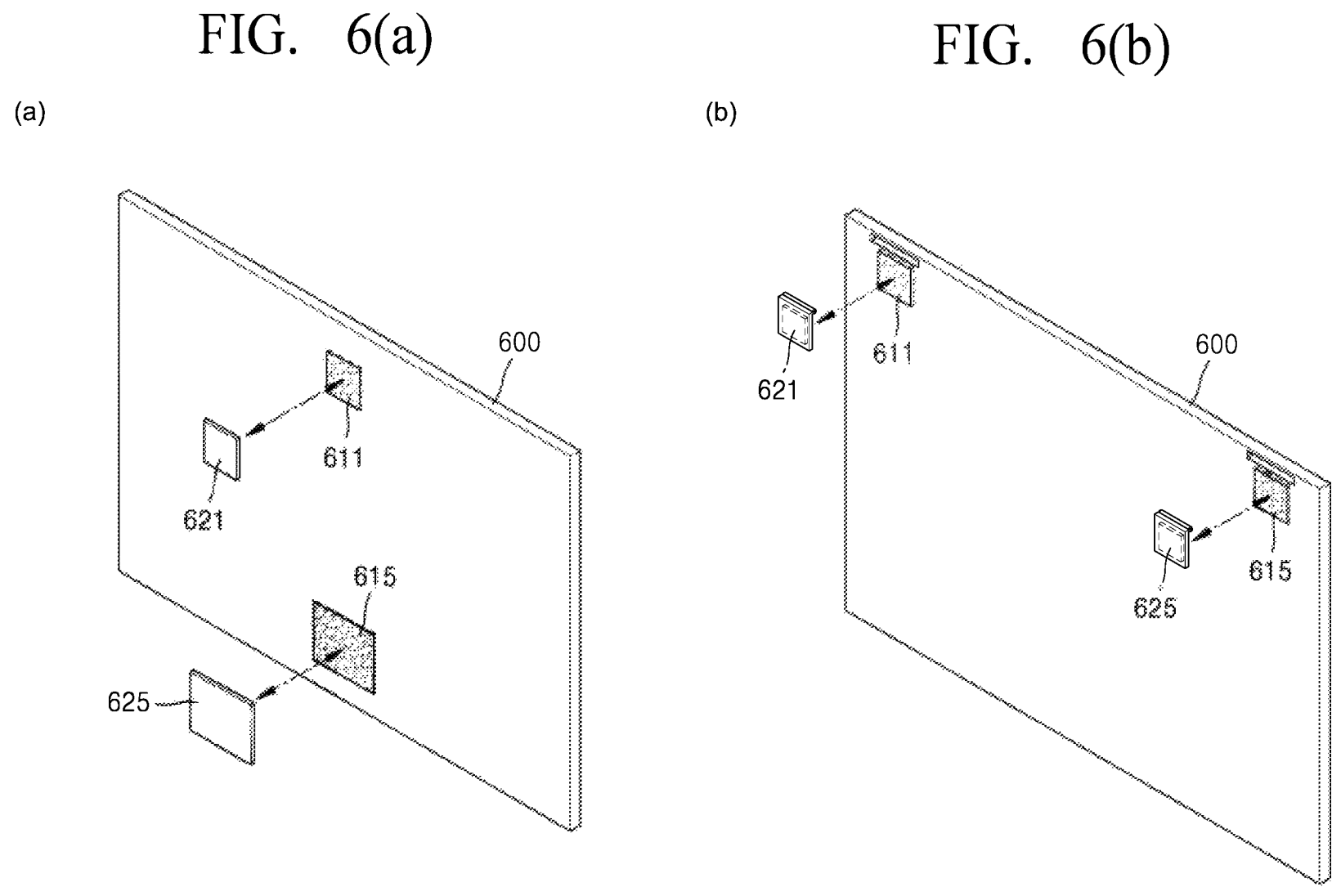

FIGS. 6(*a*) and 6(*b*) illustrate a case where an electronic apparatus includes a plurality of couplers, according to an embodiment.

Referring to FIG. 6(*a*) and FIG. 6(*b*), two couplers, that is, a first coupler 611 and a second coupler 615, may be arranged on a rear surface of an electronic apparatus 600 in a vertical direction or a horizontal direction. However, this is only an embodiment, and the electronic apparatus 600 may include more than two couplers.

FIG. 6(*a*) is a diagram illustrating that the two couplers are mounted on the rear surface of the electronic apparatus 600 in the vertical direction. As in FIG. 6(*a*), when the two couplers are mounted on the rear surface of the electronic apparatus 600 in the vertical direction, the electronic apparatus 600 may be easily fixed to a support that is fixed to a vertically long pole or wall surface.

FIG. 6(*b*) is a diagram illustrating that the two couplers are mounted on the rear surface of the electronic apparatus 600 in the horizontal direction. As in FIG. 6(*b*), when the two couplers are mounted on the rear surface of the electronic apparatus 600 in the horizontal direction, the electronic apparatus 600 may be easily fixed to a support that is fixed to a horizontally long pole or wall surface.

The first coupler 611 and the second coupler 615 may be detached/attached from/to a first support 621 and a second support 625, respectively. The first support 621 and the second support 625 may be fixed to a wall surface, a ceiling, or the like.

In an embodiment, the electronic apparatus 600 may allow a magnetic path of a magnetic energy control magnet to pass through or not to pass through a magnetic material such that the first coupler 611 and the second coupler 615 are coupled to or separated from the first support 621 and the second support 625, respectively.

In an embodiment, the first coupler 611 and the second coupler 615 may respectively include a first magnetic energy control magnet and a second magnetic energy control magnet. In this case, each of the first support 621 and the second support 625 may include a magnetic material for coupling with the magnetic energy control magnet.

The first magnetic energy control magnet included in the first coupler 611 and the second magnetic energy control magnet included in the second coupler 615 may each form a magnetic path according to an applied current. The electronic apparatus 600 may control the magnetic paths of the first magnetic energy control magnet and the second magnetic energy control magnet by supplying a current to the first magnetic energy control magnet and the second magnetic energy control magnet, respectively.

Alternatively, in an embodiment, the first support 621 and the second support 625 may respectively include the first magnetic energy control magnet and the second magnetic energy control magnet. In this case, each of the first support 621 and the second support 625 may include a connector for receiving a current, and the first coupler 611 and the second coupler 615 may respectively include connectors for supplying a current to the first support 621 and the second support 625. The electronic apparatus 600 may supply a current to each of the first coupler 611 and the second coupler 615, and the current supplied to the first coupler 611 and the second coupler 615 may be applied to the first support 621 and the second support 625 through the connector. In addition, the first coupler 611 and the second coupler 615 may respectively include magnetic materials for coupling with the first magnetic energy control magnet and the second magnetic energy control magnet. The first magnetic energy control magnet and the second magnetic energy control magnet may each form a magnetic path that passes through or not passing through the magnetic materials according to the current applied from the electronic apparatus 600.

In another embodiment, the electronic apparatus 600 may allow the first coupler 611 and the second coupler 615 to be respectively coupled with or separated from the first support 621 and the second support 625 by using a fastener in a physical form without using a magnetic material.

To this end, each of the first coupler 611 and the second coupler 615 may include a magnetic energy control magnet and a fastener in a physical form, which moves along the magnetic energy control magnet. In addition, each of the first support 621 and the second support 625 may have a structure with which the fastener in the physical form may be engaged and coupled. Alternatively, each of the first support 621 and the second support 625 may include a magnetic energy control magnet and a fastener in a physical form, which moves along the magnetic energy control magnet, and each of the first coupler 611 and the second coupler 615 may be formed to have a structure with which the fastener in the physical form is engaged.

The electronic apparatus 600 may control a physical fastener to move in a predetermined direction by controlling the magnetic paths of the first magnetic energy control magnet and the second magnetic energy control magnet. According to the movement of the physical fastener, the first coupler 611 and the second coupler 615 may be physically coupled with or separated from the first support 621 and the second support 625, respectively.

As such, according to an embodiment, when a plurality of couplers are mounted on the electronic apparatus 600, a plurality of magnetic energy control magnets are also used, and thus, the electronic apparatus 600 may be more strongly fixed to a support. In addition, according to an arrangement type of the plurality of couplers, the electronic apparatus 600 may be easily fixed to a horizontally long or vertically long wall surface or pole.

Figure 7:
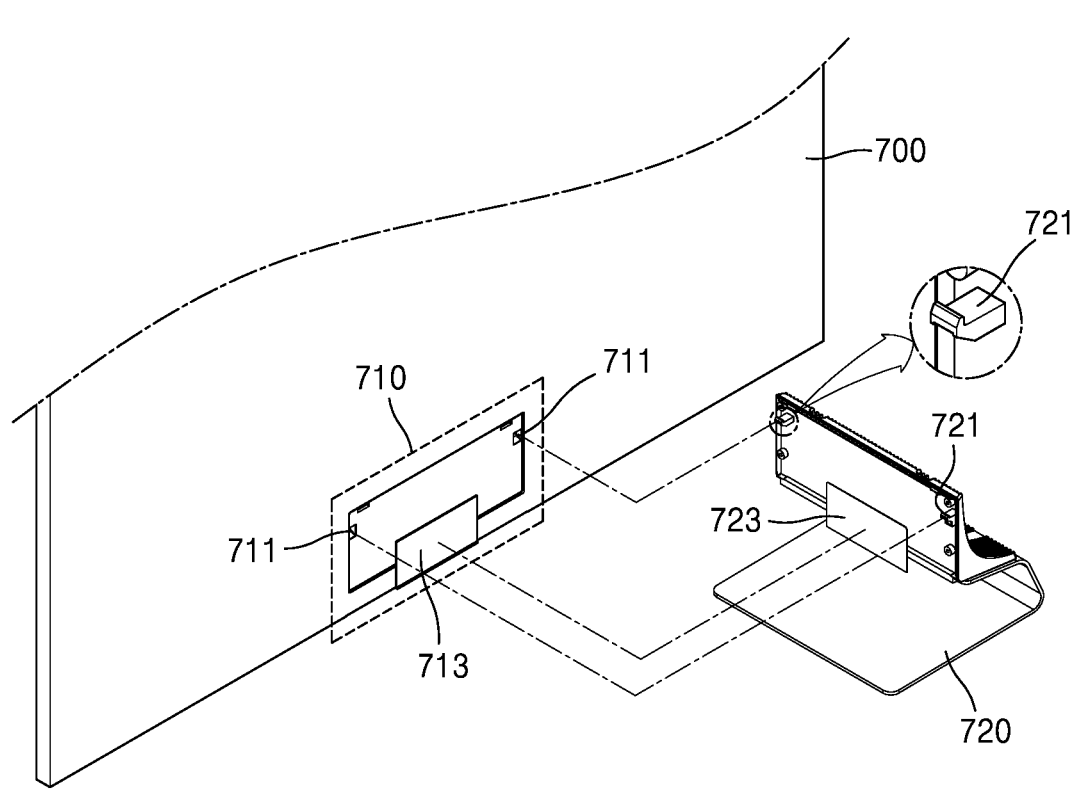
FIG. 7 illustrates a case where an electronic apparatus is mounted on a support in the form of a stand, according to an embodiment.

FIG. 7 illustrates a case where an electronic apparatus is mounted on a support in the form of a stand, according to an embodiment.

Referring to FIG. 7, a support 720 may be in the form of a stand. When the support 720 is in the form of a stand, a coupler 710 may be located at a lower region of a rear surface of an electronic apparatus 700.

The support 720 of FIG. 7 may include a physical support 721 and a magnetic support 723. In addition, the coupler 710 included in a lower end of the rear surface of the electronic apparatus 700 may include a physical coupler 711 and a magnetic coupler 713.

The physical coupler 711 may refer to a coupler that is physically coupled to the support 720 through a structure or a shape, such as a protrusion or a groove, or a bolt or a nut. The physical coupler 711 of the electronic apparatus 700 may be engaged and coupled with the physical support 721 included in the support 720.

The magnetic coupler 713 may refer to a coupler that is coupled by using a magnetic path according to a line of magnetic force of a magnetic energy control magnet, according to an embodiment. The magnetic coupler 713 may be coupled with the magnetic support 723 included in the support 720 by using magnetism.

In an embodiment, one of the magnetic coupler 713 and the magnetic support 723 may include a magnetic energy control magnet. In this case, the other one of the magnetic coupler 713 and the magnetic support 723 may include a magnetic material for coupling with the magnetic energy control magnet.

As such, according to an embodiment, the electronic apparatus 700 may be firmly coupled to the support 720 by using both the physical coupler 711 and the magnetic coupler 713.

In addition, the electronic apparatus 700 may be attached to various types of supports.

FIGS. 8(a)-8(d) are diagrams for describing adjustment of the angle of an electronic apparatus by using a magnetic path of a magnetic energy control magnet, according to an embodiment.

Referring to FIGS. 8(a)-8(d), a first coupler 811 and a second coupler 813 may be arranged on a rear surface of an electronic apparatus 800 in a horizontal direction. In an embodiment, the first coupler 811 and the second coupler 813 may be located close to both left and right end corners of the rear surface of the electronic apparatus 800, respectively. The first coupler 811 may be detached/attached from/to a first support 821, and the second coupler 813 may be detached/attached from/to a second support 823.

The first support 821 and the second support 823 may be fixed to a wall surface or a ceiling and may be detached/attached from/to the first coupler 811 and the second coupler 813, respectively.

In FIGS. 8(a)-8(d), it is assumed that each of the first support 821 and the second support 823 includes a magnetic energy control magnet. In addition, each of the first coupler 811 and the second coupler 813 may include a magnetic material for detachment/attachment from/to the magnetic energy control magnet. In this case, the first support 821 and the second support 823 and the first coupler 811 and the second coupler 813 may respectively include connectors to be electrically connected to each other. In an embodiment, each of the connectors may be a pogo pin, but is not limited thereto. The electronic apparatus 800 may apply a current to the connector included in the first support 821 through the connector included in the first coupler 811. In addition, the electronic apparatus 800 may apply a current to the connector included in the second support 823 through the connector included in the second coupler 813.

The electronic apparatus 800 may control magnetic paths of the magnetic energy control magnets respectively included in the first support 821 and the second support 823 by applying a current according to a control signal to the first support 821 and the second support 823 through the connectors.

In an embodiment, the electronic apparatus 800 may receive a request from a user to rotate in a predetermined direction through a user input or the like. In an embodiment, the electronic apparatus 800 may generate a control signal according to a rotation direction received from the user. The electronic apparatus 800 may control one of the first coupler 811 and the second coupler 813 to be attached to a corresponding support and may control the other one not to be attached to a corresponding support, according to the control signal.

In an embodiment, when a rotation function is selected by the user, the electronic apparatus 800 may allow at least one of the first coupler 811 and the second coupler 813 to be attached to a corresponding support, thereby preventing a sudden separation of both the first coupler 811 and the second coupler 813 from the respective supports.

Figures 8A, 8B, 8C, 8D:
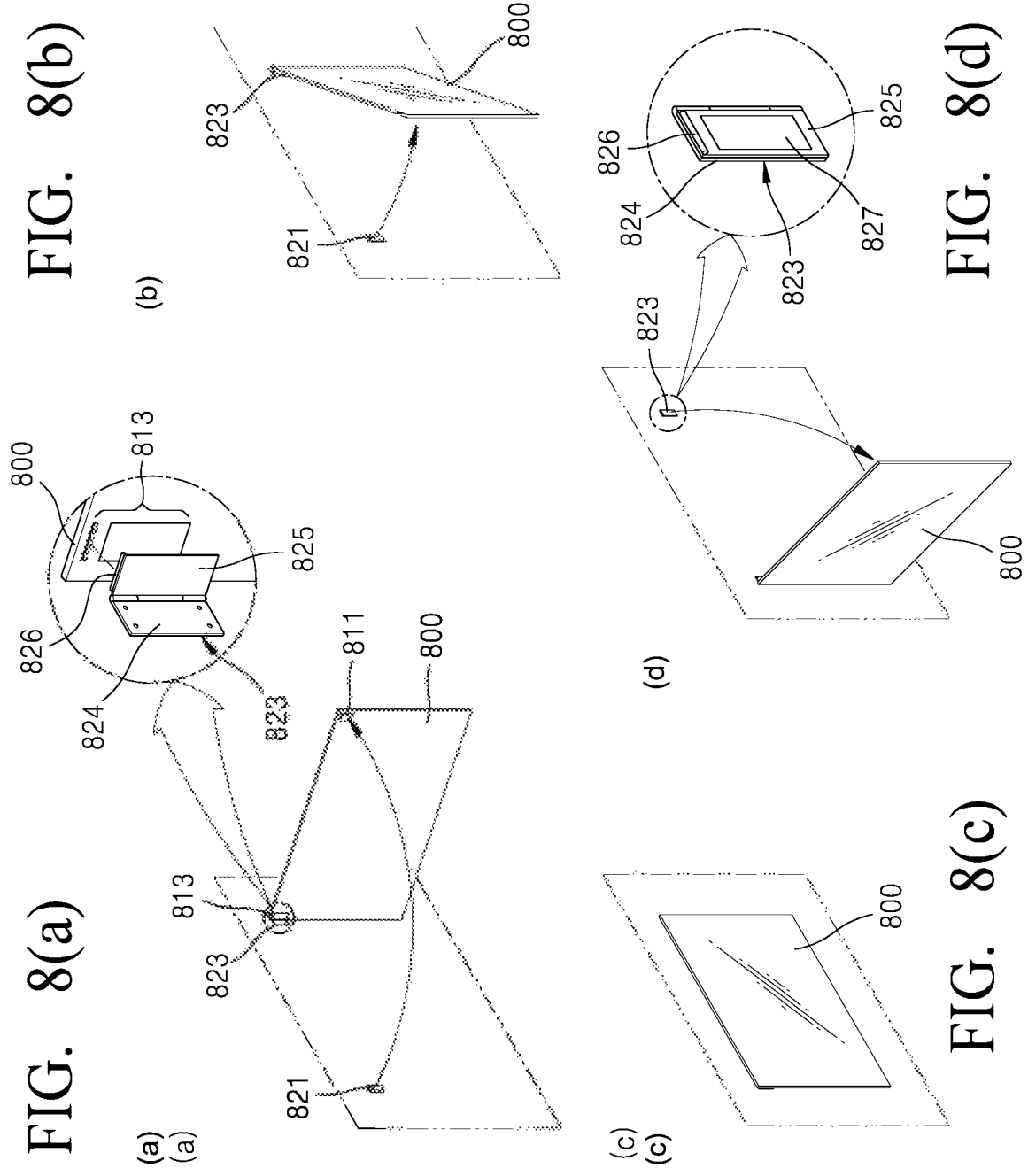
FIGS. 8(a)-8(d) are diagrams for describing adjustment of the angle of an electronic apparatus by using a magnetic path of a magnetic energy control magnet, according to an embodiment.

FIG. 8(a) illustrates that while the first coupler 811 located on the rear surface of the electronic apparatus 800 is separated from the first support 821, the electronic apparatus 800 is rotated by the maximum angle from a fixed surface in a widthwise direction.

Referring to FIG. 8(a), the electronic apparatus 800 may prevent the first coupler 811 and the first support 821 from being coupled with each other by applying a current having a predetermined polarity to the first support 821 through the connectors of the first coupler 811 and the first support 821 under control by a user.

In addition, the electronic apparatus 800 may allow the second coupler 813 and the second support 823 to be coupled with each other by applying a current having a different polarity to the second support 823 through the connectors of the second coupler 813 and the second support 823.

In an embodiment, each of the first support 821 and the second support 823 may include two surfaces. A first surface 824 among the two surfaces included in the second support 823 may be a fixed surface fixed to a wall or a ceiling by using a bolt or the like. In addition, in an embodiment, a second surface 825 included in the second support 823 may be a detachable/attachable surface coupled with or separated from the second coupler 813.

In an embodiment, a hinge may be included between the two surfaces included in the second support 823. The first surface 824 and the second surface 825 may be engaged with each other and folded by the hinge. When the first surface 824 and the second surface 825 are folded and physically coupled with each other, the angle between the two surfaces becomes 0 degrees.

In addition, the first surface 824 and the second surface 825 may have a structure that is unfolded up to a predetermined angle, for example, 90 degrees, with respect to the hinge. The first surface 824 is a fixed surface fixed to a ceiling or a wall, and the second surface 825 is a detachable/attachable surface coupled with the second coupler 813 of the electronic apparatus 800, and thus, the angle formed by the fixed surface and the electronic apparatus 800 may be equal to the angle formed by the first surface 824 and the second surface 825. In other words, the electronic apparatus 800 may be swiveled by a predetermined angle from the ceiling or the wall to rotate in a rightward direction.

FIG. 8(b) illustrates that while the first coupler 811 located on the rear surface of the electronic apparatus 800 is separated from the first support 821, the electronic apparatus

800 is rotated by a predetermined angle less than or equal to the maximum angle from the fixed surface in the widthwise direction.

FIG. 8(c) illustrates that the first coupler 811 and the second coupler 813, located on the rear surface of the electronic apparatus 800, are respectively coupled with the first support 821 and the second support 823.

Referring to FIG. 8(c), the electronic apparatus 800 may control the magnetic paths of the magnetic energy control magnets of the first support 821 and the second support 823 to respectively pass through the magnetic material of the first coupler 811 and the magnetic material of the second coupler 813 by applying a current having a predetermined polarity to the first coupler 811 and the second coupler 813 under control by the user. In this case, the first coupler 811 and the second coupler 813 are respectively coupled with the first support 821 and the second support 823.

FIG. 8(d) illustrates while the second coupler 813 located on the rear surface of the electronic apparatus 800 is separated from the second support 823, the electronic apparatus 800 is rotated in a leftward direction by the maximum angle from the fixed surface in the widthwise direction.

In FIG. 8(d), the first surface 824 and the second surface 825 included in the second support 823 may be engaged with each other and folded. The first surface 824 and the second surface 825 may be physically coupled to each other through a groove or a protrusion with respect to the hinge and folded.

In FIG. 8(d), since the first coupler 811 and the first support 821 are coupled with each other, the electronic apparatus 800 may be swiveled leftward from the fixed surface by a predetermined angle with respect to the hinge included in the first support 821 and rotated.

FIGS. 8(a)-8(d) illustrate that the first coupler 811 and the second coupler 813 are arranged on the rear surface of the electronic apparatus 800 in the horizontal direction, but this is only an embodiment, and the first coupler 811 and the second coupler 813 may be arranged on the rear surface of the electronic apparatus 800 in the vertical direction. In this case, the first coupler 811 and the second coupler 813 may be located close to an upper end corner and a lower end corner of the rear surface of the electronic apparatus 800, respectively. The electronic apparatus 800 may control each of the two couplers such that one of the two couplers is separated from a corresponding support. In this case, the electronic apparatus 800 may be tilted by a predetermined angle in a longitudinal direction, that is, an up-down direction, with respect to the fixed surface and rotated.

As such, according to an embodiment, the electronic apparatus 800 may control each of the two couplers to control whether the coupler and the support are coupled with each other, such that the electronic apparatus 800 rotates in a predetermined direction.

Figure 9:
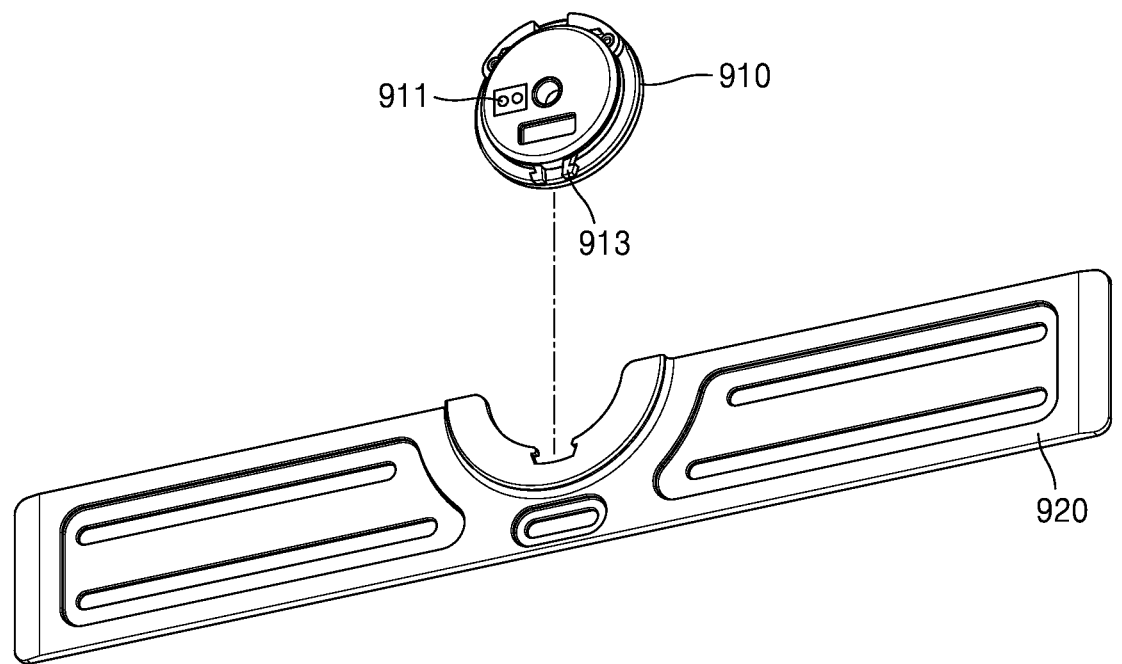
FIG. 9 is a diagram for describing a coupler and a support, according to an embodiment.

FIG. 9 is a diagram for describing a coupler and a support, according to an embodiment.

Referring to FIG. 9, a coupler 910 may include a magnetic energy control magnet and may be coupled to a support 920 or separated from the support 920.

The support 920 may be fixed to a fixed surface such as a wall surface or a ceiling. The support 920 may be formed to have a structure into which the coupler 910 is inserted and coupled.

In an embodiment, the coupler 910 may include a user input unit 911 for controlling a current applied to the magnetic energy control magnet included in the coupler 910. The user input unit 911 may receive a user input for controlling a magnetic path of the magnetic energy control magnet.

In FIG. 9, as an embodiment, the user input unit 911 is shown in the form of a button for receiving a push input of a user, but is not limited thereto, and the user input unit 911 may be implemented in various forms, such as a touch panel, wheel, or a switch, in addition to the button. In addition, the user input unit 911 may include a communicator and receive a user input received from a remote controller such as a remote control. The remote controller may control the coupler 910 by using short-range communication including infrared, ultra-wide band (UWB), Bluetooth, or BLE. The user input unit 911 may include a Bluetooth module, an infrared module, or a UWB module and receive a user input received from the remote controller.

In an embodiment, the coupler 910 may generate a control signal according to a user's input received through the user input unit 911. For example, as shown in FIG. 9, when the user input unit 911 includes two buttons, the coupler 910 may generate different control signals according to the buttons pushed by a user. In other words, when the user pushes a left button, the coupler 910 may generate a control signal that allows the magnetic path of the magnetic energy control magnet to be in a first direction. In addition, when the user pushes a right button, the coupler 910 may generate a control signal that allows the magnetic path of the magnetic energy control magnet to be in a second direction. The coupler 910 may allow currents having different polarities to be applied to the magnetic energy control magnet according to the control signal such that the magnetic path may be in the first direction or the second direction.

Alternatively, in another embodiment, a processor of an electronic apparatus in which the coupler 910 is mounted, other than the coupler 910, may generate a control signal according to a user's input received through the user input unit 911. The processor may allow currents having different polarities to be applied to the magnetic energy control magnet according to the generated control signal.

In an embodiment, the support 920 of FIG. 9 may not include a magnetic material. In other words, the support 920 may have a structure that is coupled with or separated from the coupler 910 by using a fastener in a physical form, instead of a magnetic material.

In an embodiment, the coupler 910 may further include a hook 913. The hook 913 may be a magnetic material having a curved end. The hook 913 may be located on each of left and right sides of a lower end of the coupler 910. In an embodiment, the hook 913 may be arranged in a structure that allows the hook 913 to move to the left or the right along the magnetic path of the magnetic energy control magnet.

In an embodiment, the support 920 may include a fastener that is caught by the hook 913 included in the coupler 910. In an embodiment, the coupler 910 may control the position of the hook 913 by controlling the magnetic path of the magnetic energy control magnet according to a control signal in response to a user input. In other words, the coupler 910 may control the hook 913 arranged on the left to move further to the left and the hook 913 arranged on the right to move further to the right. In this case, the hooks 913 that have respectively moved to the left and the right are caught at the moved position on the fastener formed in the support 920 and are fixed to the support 920.

A structure in which the coupler 910 and the support 920 are coupled with each other by using the movement of the hook along the magnetic path of the magnetic energy control magnet is described in more detail with reference to FIGS. 10 and 11.

Figure 10A:
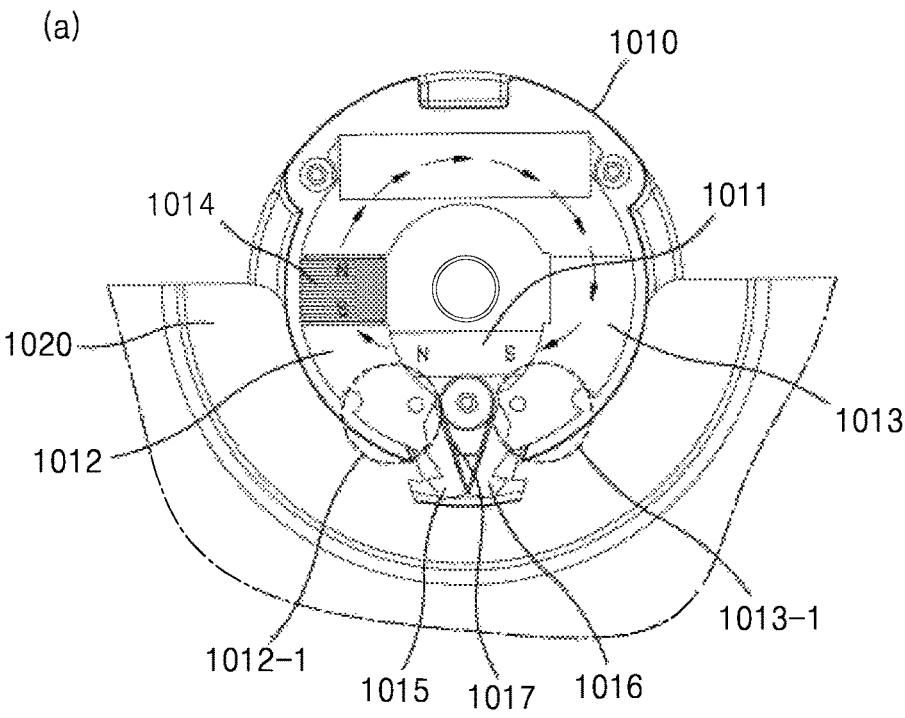
FIGS. 10(a) and 10(b) are diagrams for describing attachment/detachment of a coupler and a support by using a hook, according to an embodiment.
Figure 10B:
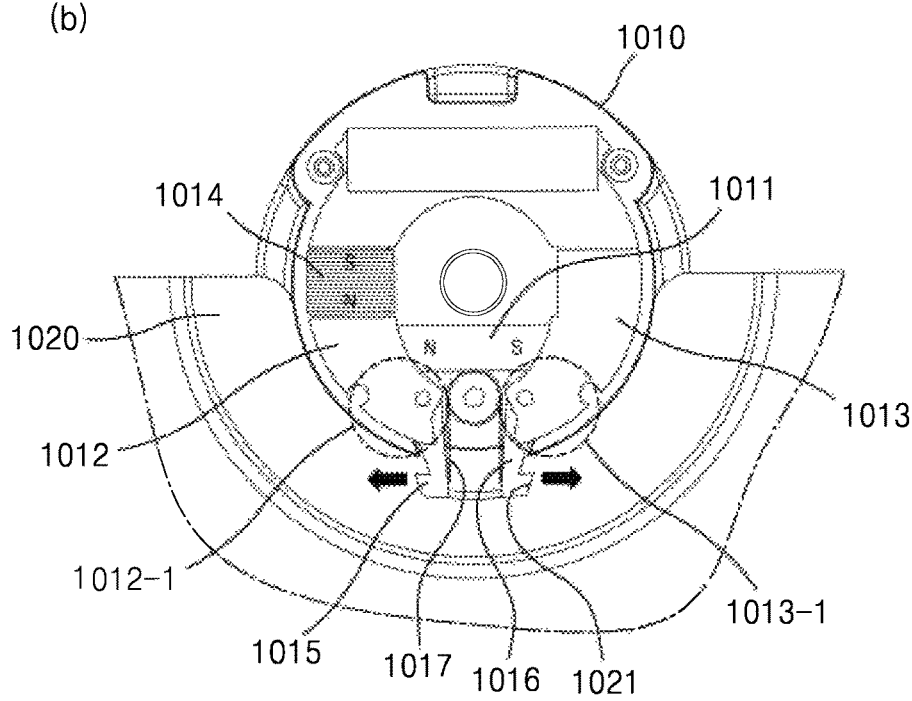

FIGS. 10(*a*) and 10(*b*) are diagrams for describing attachment/detachment of a coupler and a support by using a hook, according to an embodiment.

Referring to FIGS. 10(*a*) and 10(*b*), a coupler 1010 may include a magnetic energy control magnet and may be coupled to a support 1020 or separated from the support 1020.

Although not shown in FIGS. 10(*a*) and 10(*b*), the coupler 1010 may include a user input unit for controlling a current applied to the magnetic energy control magnet. Alternatively, in another embodiment, an electronic apparatus in which the coupler 1010 is mounted, other than the coupler 1010, may include the user input unit and receive a user input for controlling a magnetic path of the magnetic energy control magnet.

In an embodiment, the magnetic energy control magnet included in the coupler 1010 may include a permanent magnet 1011, a first pole piece 1012 in contact with an N pole of the permanent magnet 1011, a second pole piece 1013 in contact with an S pole of the permanent magnet 1011, and a coil 1014 wound around at least one of the first pole piece 1012 and the second pole piece 1013. Another pole piece may be arranged at upper ends of the first pole piece 1012 and the second pole piece 1013, or a pole piece extending from the first pole piece 1012 or the second pole piece 1013 may be arranged at the upper ends thereof.

In an embodiment, the coupler 1010 may further include a hook including a magnetic material. The hook may include a first hook 1015 rotatably arranged at a lower end of the first pole piece 1012 and a second hook 1016 rotatably arranged at a lower end of the second pole piece 1013. The first hook 1015 and the second hook 1016 may not directly contact with the first pole piece 1012 and the second pole piece 1013 and may be indirectly contact with the first pole piece 1012 and the second pole piece 1013 through a contact member, or may be rotatably arranged near the first pole piece 1012 and the second pole piece 1013.

A spring 1017 may have a structure in which ends of the spring 1017 are gathered at the center of the lower ends of the first pole piece 1012 and the second pole piece 1013 when no external force is applied. The first hook 1015 and the second hook 1016 are respectively connected to left and right ends of the spring 1017, and are located at the center of the lower ends of the first pole piece 1012 and the second pole piece 1013 according to the force of the spring 1017. However, the spring 1017 is not an essential element, and in some cases, the coupler 1010 may not include a spring.

The support 1020 may include a fastener 1021 for fastening the hook. The fastener 1021 may be formed as a groove having a size corresponding to an end of the hook such that the curved end of the hook is caught.

In an embodiment, the coupler 1010 may allow currents having different polarities to be applied to the magnetic energy control magnet according to a control signal generated in response to a user input. In other words, the coupler 1010 may apply a current according to a control signal to the coil 1014 such that the first pole piece 1012 around which the coil 1014 is wound becomes an electromagnet.

FIG. 10(*a*) illustrates a case where a region around which a coil is wound in the first pole piece 1012 becomes an electromagnet according to the polarity of a current applied to the coil 1014.

As shown in FIG. 10(*a*), in the region around which the coil is wound in the first pole piece 1012, a portion close to the permanent magnet 1011 may become an S pole, and a portion far from the permanent magnet 1011 may become an N pole. In this case, a magnetic path in the form of a line of magnetic force coming from the N pole of the permanent magnet 1011 and entering the S pole in a clockwise direction is formed. When the magnetic path in the form as in FIG. 10(*a*) is formed, the magnetic path is not formed at a lower end 1012-1 of the first pole piece 1012 and a lower end 1013-1 of the second pole piece 1013. In this case, since the first hook 1015 and the second hook 1016 receive force only by the spring 1017, the first hook 1015 and the second hook 1016 are located at the center of the lower end 1012-1 of the first pole piece 1012 and the lower end 1013-1 of the second pole piece 1013.

FIG. 10(*b*) illustrates a case where a current having a polarity different from that in FIG. 10(*a*) is applied to the coil 1014.

Referring to FIG. 10(*b*), according to the current applied to the coil 1014, in the region around which the coil is wound in the first pole piece 1012, the portion close to the permanent magnet 1011 becomes an N pole, and the portion far from the permanent magnet 1011 becomes an S pole. In this case, the line of magnetic force coming from the N pole of the permanent magnet 1011 does not form a magnetic path in the clockwise direction due to the polarity of the electromagnet formed by the coil 1014. Instead, the lower end 1012-1 of the first pole piece 1012 and the lower end 1013-1 of the second pole piece 1013 may respectively have an N pole and an S pole.

The first hook 1015 and the second hook 1016 are magnetic materials, and thus, have the property of being coupled to polarized objects. When the force that the polarity of the lower end 1012-1 of the first pole piece 1012 and the lower end 1013-1 of the second pole piece 1013 pulls the first hook 1015 and the second hook 1016 is greater than the force that the spring 1017 pulls the first hook 1015 and the second hook 1016 toward the center, the first hook 1015 and the second hook 1016 move in a direction opposite to a direction in which the first hook 1015 and the second hook 1016 are pulled by the spring 1017. Therefore, the first hook 1015 moves to the left toward the lower end 1012-1 of the first pole piece 1012 located nearby, and the second hook 1016 moves to the right toward the lower end 1013-1 of the second pole piece 1013 located nearby.

In this case, the first hook 1015 that has moved to the left and the second hook 1016 that has moved to the right may be caught in a groove of the fastener 1021 included in the support 1020 and may be fixed to the support 1020.

As such, according to an embodiment, the coupler 1010 may further include a physical fastener such as a hook such that the physical fastener moves along the magnetic path of the magnetic energy control magnet and thus, may be coupled to the support.

Figure 11A:
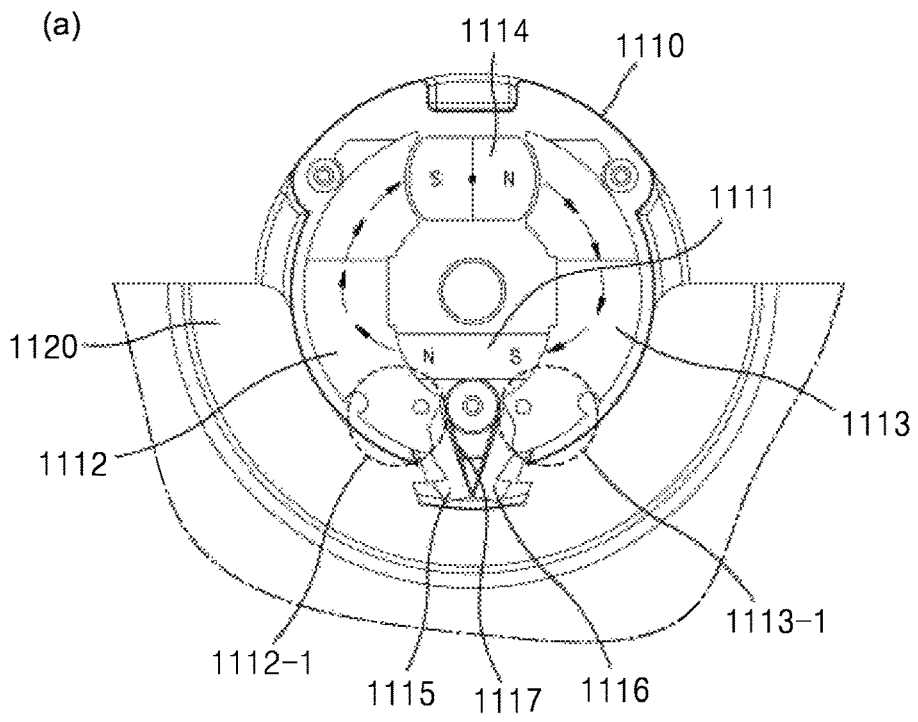
FIGS. 11(a) and 11(b) are diagrams for describing attachment/detachment of a coupler and a support by using a hook, according to another embodiment.
Figure 11B:
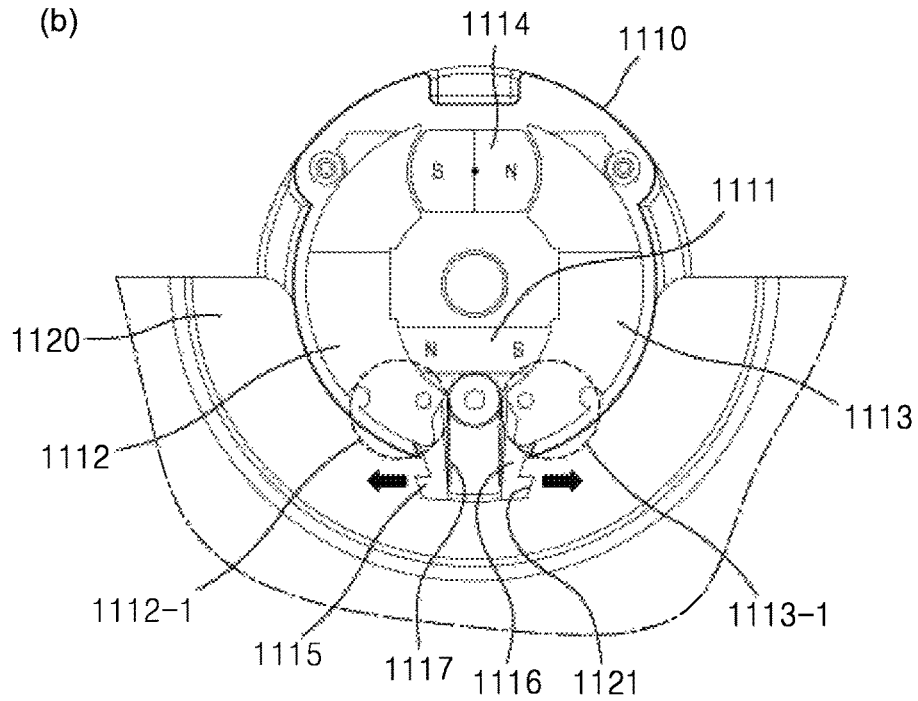

FIGS. 11(*a*) and 11(*b*) are diagrams for describing attachment/detachment of a coupler and a support by using a hook, according to another embodiment.

Referring to FIGS. 11(*a*) and (11(*b*), a magnetic energy control magnet included in a coupler 1110 may include a permanent magnet 1111, a first pole piece 1112 in contact with an N pole of the permanent magnet 1111, and a second pole piece 1113 in contact with an S pole of the permanent magnet 1111.

Unlike the coupler 1010 of FIGS. 10(*a*) and 10(*b*), the coupler 1110 of FIGS. 11(*a*) and 11(*b*) may further include a rotating magnet 1114. The rotating magnet 1114 may be arranged in a rotatable form at upper ends of the first pole piece 1112 and the second pole piece 1113.

Although not shown in FIGS. 11(*a*) and 11(*b*), a coil may be wound around at least one of the first pole piece 1112 and the second pole piece 1113. In this case, as described above with reference to FIGS. 10(*a*) and 10(*b*), a current having a polarity determined according to a user's input may be applied to the first pole piece 1112 or the second pole piece 1113 through the coil.

In another embodiment, a current may be directly applied to the rotating magnet 1114 other than the first pole piece 1112 and the second pole piece 1113. In this case, the rotating magnet 1114 may rotate according to the applied current.

FIG. 11(*a*) illustrates a case where the S pole of the rotating magnet 1114 is magnetically connected to the first pole piece 1112 in close proximity and the N pole of the rotating magnet 1114 is magnetically connected to the second pole piece 1113 in close proximity, through the coil wound around the pole piece or according to a current applied to the rotating magnet 1114.

When the rotating magnet 1114 is arranged as in FIG. 11(*a*), a line of magnetic force coming from the N pole of the permanent magnet 1111 is formed in the direction of an S pole of the rotating magnet 1114, and a line of magnetic force coming from an N pole of the rotating magnet 1114 is formed in the direction of the S pole of the permanent magnet 1111.

When the magnetic path in the form as in FIG. 11(*a*) is formed, the magnetic path is not formed at a lower end 1112-1 of the first pole piece 1112 and a lower end 1113-1 of the second pole piece 1113, and thus, the lower end 1112-1 of the first pole piece 1112 and the lower end 1113-1 of the second pole piece 1113 are not polarized. Therefore, a first hook 1115 and a second hook 1116 are located at the center by the force of a spring 1117.

FIG. 11(*b*) illustrates a case where the N pole of the rotating magnet 1114 is magnetically connected to the first pole piece 1112 in close proximity and the S pole of the rotating magnet 1114 is magnetically connected to the second pole piece 1113 in close proximity, through the coil wound around the pole piece or according to a current applied to the rotating magnet 1114.

When the rotating magnet 1114 is arranged as in FIG. 11(*b*), the entire first pole piece 1112 in contact with the N pole of the permanent magnet 1111 and the N pole of the rotating magnet 1114 has an N pole, and the entire second pole piece 1113 in contact with the S pole of the permanent magnet 1111 and the S pole of the rotating magnet 1114 has an S pole. In this case, the lower end 1112-1 of the first pole piece 1112 and the lower end 1113-1 of the second pole piece 1113 also respectively have an N pole and an S pole and thus, respectively pull the first hook 1115 and the second hook 1116, which are magnetic materials. Therefore, the first hook 1115 moves to the left toward the lower end 1112-1 of the first pole piece 1112, and the second hook 1116 moves to the right toward the lower end 1113-1 of the second pole piece 1113. The first hook 1115 that has moved to the left and the second hook 1116 that has moved to the right are respectively caught in both grooves of a fastener 1121 included in a support 1120 and thus, are fixed to the support 1120.

As such, according to an embodiment, whether a hook and a support are coupled to each other may be controlled by moving the hook along a magnetic path of a magnetic energy control magnet by using a rotating magnet.

Figure 12:
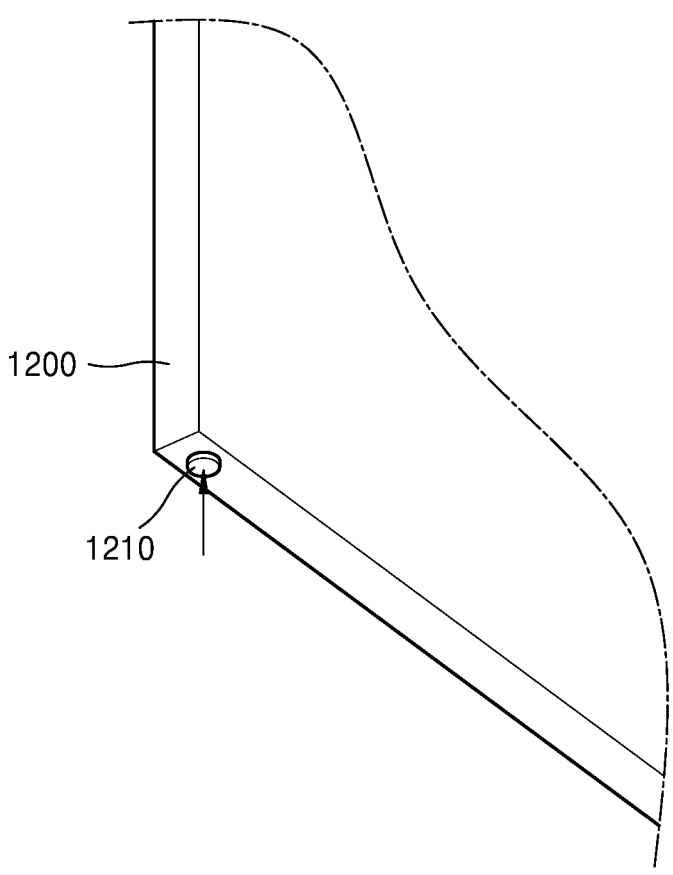
FIG. 12 is a diagram illustrating a user input unit for receiving a user input as to whether to fix an electronic apparatus, according to an embodiment.

FIG. 12 is a diagram illustrating a user input unit for receiving a user input as to whether to fix an electronic apparatus, according to an embodiment.

Referring to FIG. 12, an electronic apparatus 1200 may include a user input unit 1210.

The user input unit 1210 according to an embodiment may receive a user input as to whether to fix the electronic apparatus 1200 to a support. The electronic apparatus 1200 may receive a user input as to whether to fix the electronic apparatus 1200 from a user by using a microphone or a motion sensor, which are provided in the electronic apparatus 1200. Alternatively, the electronic apparatus 1200 may include the user input unit 1210 for receiving only a user input as to whether to fix the electronic apparatus 1200.

FIG. 12 illustrates a case where the user input unit 1210 is located at a lower end of the electronic apparatus 1200, but this is only an embodiment, and the user input unit 1210 may be located on a rear surface or side surface of the electronic apparatus 1200, near a coupler coupled to the support, or inside the coupler. In addition, in FIG. 12, the user input unit 1210 is shown as a key or button for receiving a user input through a push of a user, but is not limited thereto, and the user input unit 1210 may be implemented in the form of a touch panel for detecting a touch of the user or as a wheel or joystick for receiving a rotation operation of the user or other various types of switches. For example, the user input unit 1210 may be one of various types such as a toggle switch, a dome switch, a rocker switch, a rotary switch, or a slide switch.

In FIG. 12, a user may control the electronic apparatus 1200 to be coupled to the support or control the electronic apparatus 1200 to be separated from the support, by using the user input unit 1210 located at the lower end of the electronic apparatus 1200. For example, when the user pushes the user input unit 1210 once, the electronic apparatus 1200 may be coupled to the support, and when the user pushes the user input unit 1210 once more in this state, the electronic apparatus 1200 may be separated from the support.

As such, the user may conveniently control whether to fix the electronic apparatus 1200 by using the user input unit 1210 provided in the electronic apparatus 1200.

Figure 13A:
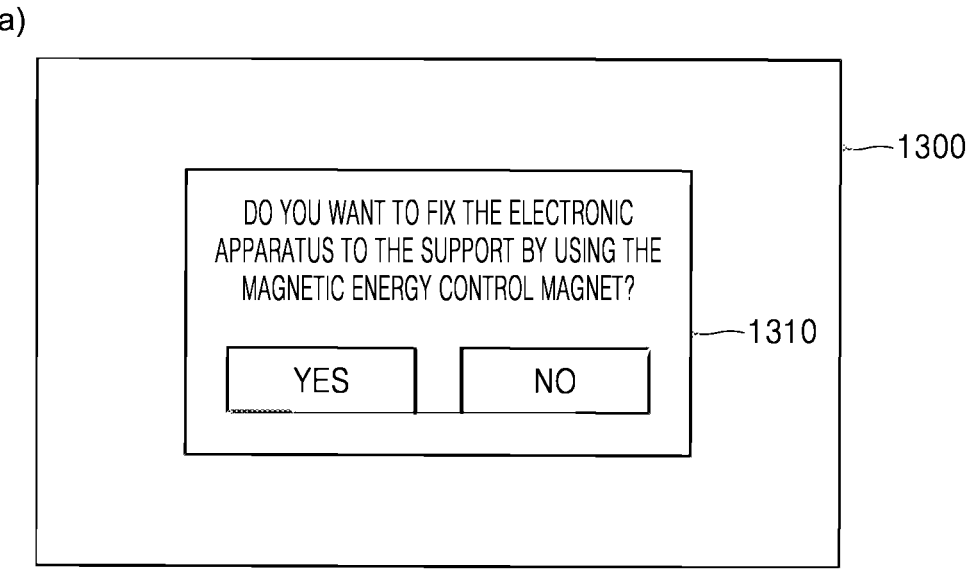
FIGS. 13(a) and 13(b) are diagrams for describing that an electronic apparatus outputs an interface screen for receiving a user input as to whether to fix the electronic apparatus, according to an embodiment.
Figure 13B:
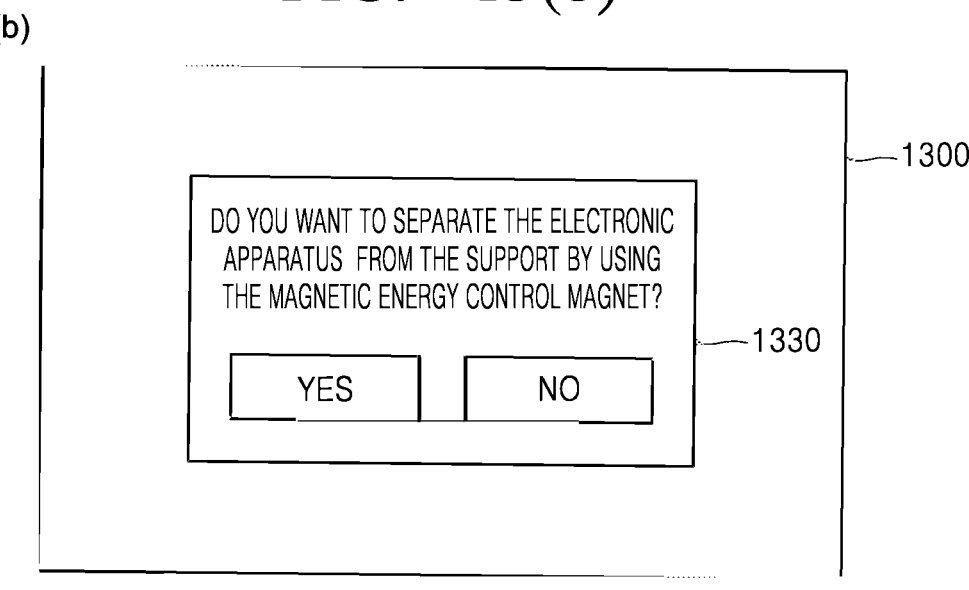

FIGS. 13(*a*) and 13(*b*) are diagrams for describing that an electronic apparatus outputs an interface screen for receiving a user input as to whether to fix the electronic apparatus, according to an embodiment.

FIG. 13(*a*) illustrates that an electronic apparatus 1300 outputs a first interface screen to ask whether to fix the electronic apparatus 1300 to a support.

FIG. 13(*b*) illustrates that the electronic apparatus 1300 outputs a second interface screen 1330 to ask whether to separate the electronic apparatus 1300 from the support.

The electronic apparatus 1300 may have an adjustment function allowing a user to directly optimize a monitor or screen of the electronic apparatus 1300. For example, the user may execute an on-screen display (OSD) function of the electronic apparatus 1300 to adjust various items such as brightness, contrast, RGB, screen size or position, and ratio of the monitor or screen.

In an embodiment, the electronic apparatus 1300 may receive a user's selection as to whether to fix or separate a coupler of the electronic apparatus 1300 to or from the support mounted on a wall, a ceiling, a stand, or the like, by using the OSD function. In an embodiment, OSD items provided by the electronic apparatus 1300 may include an item about whether to fix the electronic apparatus 1300.

The user may select the item about whether to fix the electronic apparatus 1300 among the OSD items.

When the item about whether to fix the electronic apparatus 1300 is selected from among the OSD items by the user, the electronic apparatus 1300 may output the first interface screen 1310 or the second interface screen 1330 as shown in FIGS. 13(*a*) and 13(*b*).

The first interface screen 1310 and the second interface screen 1330 may be displayed in the form of a text window on a partial region of the screen of the electronic apparatus 1300. The size, output position, transparency, and/or shape of the first interface screen 1310 and the second interface screen 1330 may be variously modified.

When the user selects the item about whether to fix the electronic apparatus 1300 among the OSD items, in an embodiment, the electronic apparatus 1300 may first determine whether the coupler included in the electronic apparatus 1300 is coupled to the support. For example, the electronic apparatus 1300 may sense whether the coupler is currently attached to the support by using a sensor or the like mounted on the coupler. In addition, when the support includes a magnetic energy control magnet, the electronic apparatus 1300 may sense, by using a connector mounted on the coupler, whether the connector is connected to a connector of the support to determine whether the coupler and the support are coupled with each other.

When the coupler is not coupled to the support, the electronic apparatus 1300 may output the first interface screen 1310 including content to ask whether to fix the electronic apparatus 1300 to the support by using the magnetic energy control magnet, as in FIG. 13(*a*).

When receiving a user input for selecting a "NO" menu through the first interface screen 1310, the electronic apparatus 1300 may end the output of the first interface screen 1310.

When receiving a user input for selecting a "YES" menu through the first interface screen 1310, the electronic apparatus 1300 may generate a control signal according to the user input and may apply a current having a polarity according to the control signal to the magnetic energy control magnet to allow the coupler and the support to be coupled with each other, such that the electronic apparatus 1300 may be fixed to the support mounted on a wall, a ceiling, a stand, or the like.

In a case where the user selects the item about whether to fix the electronic apparatus 1300 among the OSD items, when the coupler included in the electronic apparatus 1300 is already coupled to the support, the electronic apparatus 1300 may output the second interface screen 1330 including content to ask whether to separate the electronic apparatus 1300 from the support by using the magnetic energy control magnet, as in FIG. 13(*b*).

When receiving a user input for selecting a "NO" menu through the second interface screen 1330, the electronic apparatus 1300 may end the output of the second interface screen 1330.

The user may select a "YES" menu on the second interface screen 1330 to separate the electronic apparatus 1300 from the support. When receiving a user input for selecting the "YES" menu through the second interface screen 1330, the electronic apparatus 1300 may generate a control signal according to the user input and may apply a current having a polarity according to the control signal to the magnetic energy control magnet to allow the coupler to be separated from the support.

As such, a user may conveniently control whether a coupler and a support are coupled with each other by using an interface screen output on the screen of the electronic apparatus 1300.

Figure 14A:
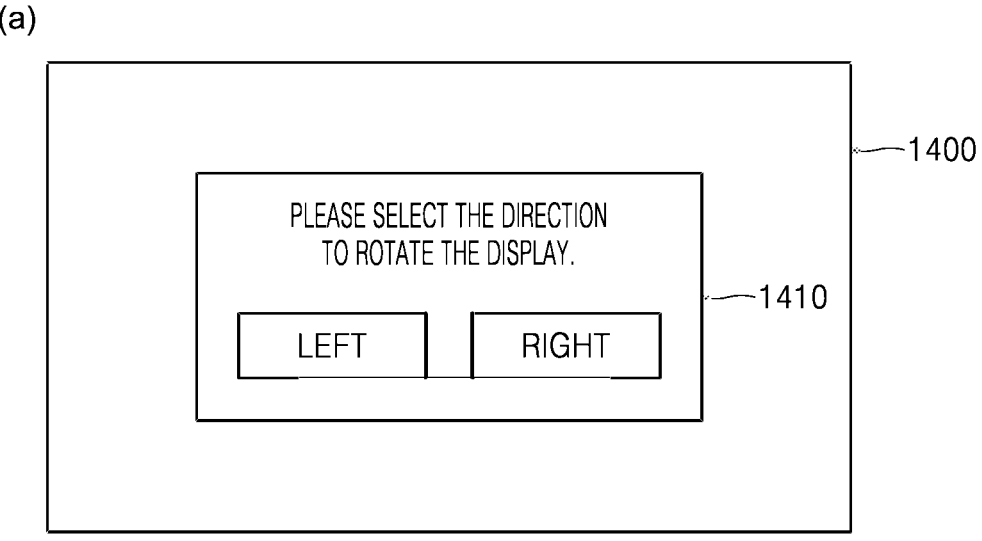
FIGS. 14(a) and 14(b) are diagrams for describing that when an electronic apparatus is rotatable, the electronic apparatus outputs an interface screen for receiving a user input for a rotation function, according to an embodiment.
Figure 14B:
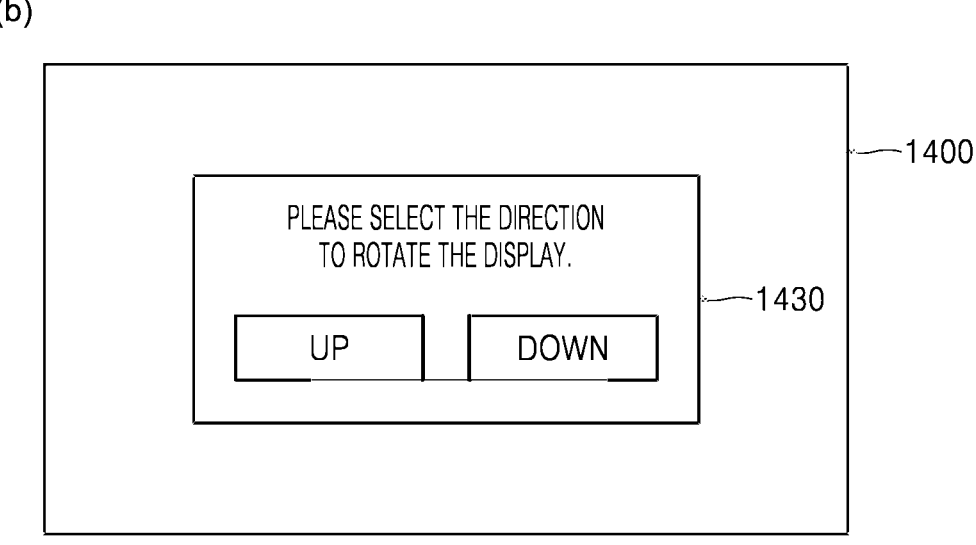

FIGS. 14(*a*) and 14(*b*) are diagrams for describing that when an electronic apparatus is rotatable, the electronic apparatus outputs an interface screen for receiving a user input for a rotation function, according to an embodiment.

Referring to FIGS. 14(*a*) and 14(*b*), an electronic apparatus 1400 may output an interface screen to ask a rotation direction of a display of the electronic apparatus 1400.

In an embodiment, the electronic apparatus 1400 may include two couplers that may be respectively coupled to or separated from two corresponding supports.

In an embodiment, when the electronic apparatus 1400 includes two couplers, at least one of a coupler and a support may include two surfaces that may be folded or unfolded.

In an embodiment, when two couplers included in the electronic apparatus 1400 are arranged in a horizontal direction and the two couplers are located near left and right corners of the display, the angle of the electronic apparatus 1400 may be adjusted in a leftward or rightward direction. In an embodiment, when the electronic apparatus 1400 has a function of adjusting the angle in the leftward or rightward direction, an OSD list provided by the electronic apparatus 1400 may include an item for display rotation. A user may select the item for display rotation from the OSD list.

FIG. 14(*a*) illustrates that when two couplers included in the electronic apparatus 1400 are arranged in a horizontal direction, a third interface screen 1410 to ask the rotation direction of the display is output.

When the two couplers included in the electronic apparatus 1400 are arranged in the horizontal direction, the electronic apparatus 1400 may generate a control signal for each of the coupler located on the left and the coupler located on the right according to a user input.

When receiving a user input for selecting a "LEFT" menu through the third interface screen 1410, the electronic apparatus 1400 may control the coupler located on the left among the two couplers, with respect to a direction in which a user gazes at a display screen, to be coupled to a corresponding support and control the coupler located on the right not to be coupled to a corresponding support. The electronic apparatus 1400 may apply currents having predetermined polarities respectively to two magnetic energy control magnets according to respective control signals for the two couplers, such that the coupler on the left and the support are coupled with each other, and the coupler on the right and the support are separated from each other. In this case, since only the coupler located on the left among the two couplers is fixed to the support, the electronic apparatus 1400 may rotate up to a predetermined angle in a leftward direction.

The electronic apparatus 1400 may be manually rotated to the left by a predetermined angle by a user-applied force. Alternatively, in another embodiment, the electronic apparatus 1400 may further include a rotating member for display rotation. In this case, the electronic apparatus 1400 may rotate the rotating member such that the display connected to the rotating member rotates together.

Likewise, when the electronic apparatus 1400 receives a user input for selecting a "RIGHT" menu through the third interface screen 1410, the electronic apparatus 1400 may control the coupler located on the right, with respect to the direction in which the user gazes at the display, to be coupled to the corresponding support and control the coupler located on the left not to be coupled to the corresponding support. In this case, since only the coupler located on the right among the two couplers is fixed to the support, the electronic apparatus 1400 may rotate up to a predetermined angle in a rightward direction.

FIG. 14(*b*) illustrates that when the two couplers included in the electronic apparatus 1400 are arranged in a vertical direction, a fourth interface screen 1430 to ask the rotation direction of the display is output.

When receiving a user input for selecting an "UP" menu through the fourth interface screen 1430, the electronic apparatus 1400 may control a coupler located at an upper end among the two couplers to be coupled to a corresponding support and control a coupler located at a lower side not to be coupled to a corresponding support. In this case, the electronic apparatus 1400 may be tilted by a predetermined angle in an upward direction.

Likewise, when the electronic apparatus 1400 receives a user input for selecting a "DOWN" menu through the fourth interface screen 1430, the electronic apparatus 1400 may control the coupler located at the lower side to be coupled to the corresponding support and control the coupler located at an upper side not to be coupled to the corresponding support, such that the electronic apparatus 1400 is tilted by a predetermined angle in a downward direction.

As such, a user may select whether to rotate a display and a rotation direction of the display by using an interface screen and may control an electronic apparatus to rotate accordingly.

Figure 15:
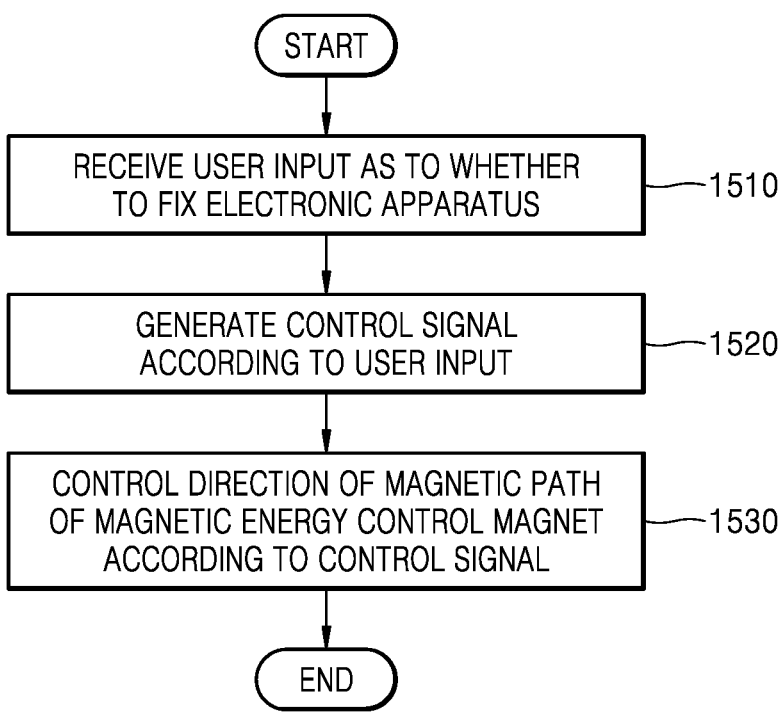
FIG. 15 is a flowchart illustrating an operating method of an electronic apparatus, according to an embodiment.

FIG. 15 is a flowchart illustrating an operating method of an electronic apparatus, according to an embodiment.

Referring to FIG. 15, the electronic apparatus may receive a user input as to whether to fix the electronic apparatus (operation 1510). The electronic apparatus may receive a user input as to whether to fix or separate the electronic apparatus to or from a support through a user input unit.

The electronic apparatus may generate a control signal according to the user input (operation 1520). The control signal may be a signal for controlling the polarity of a current applied to a magnetic energy control magnet.

The electronic apparatus may control the direction of a magnetic path of the magnetic energy control magnet according to the control signal (operation 1530). The electronic apparatus may supply a current having a predetermined polarity according to the control signal to a coupler or the support connected to the coupler to control the direction of the magnetic path of the magnetic energy control magnet and control detachment/attachment of the electronic apparatus accordingly.

Figure 16:
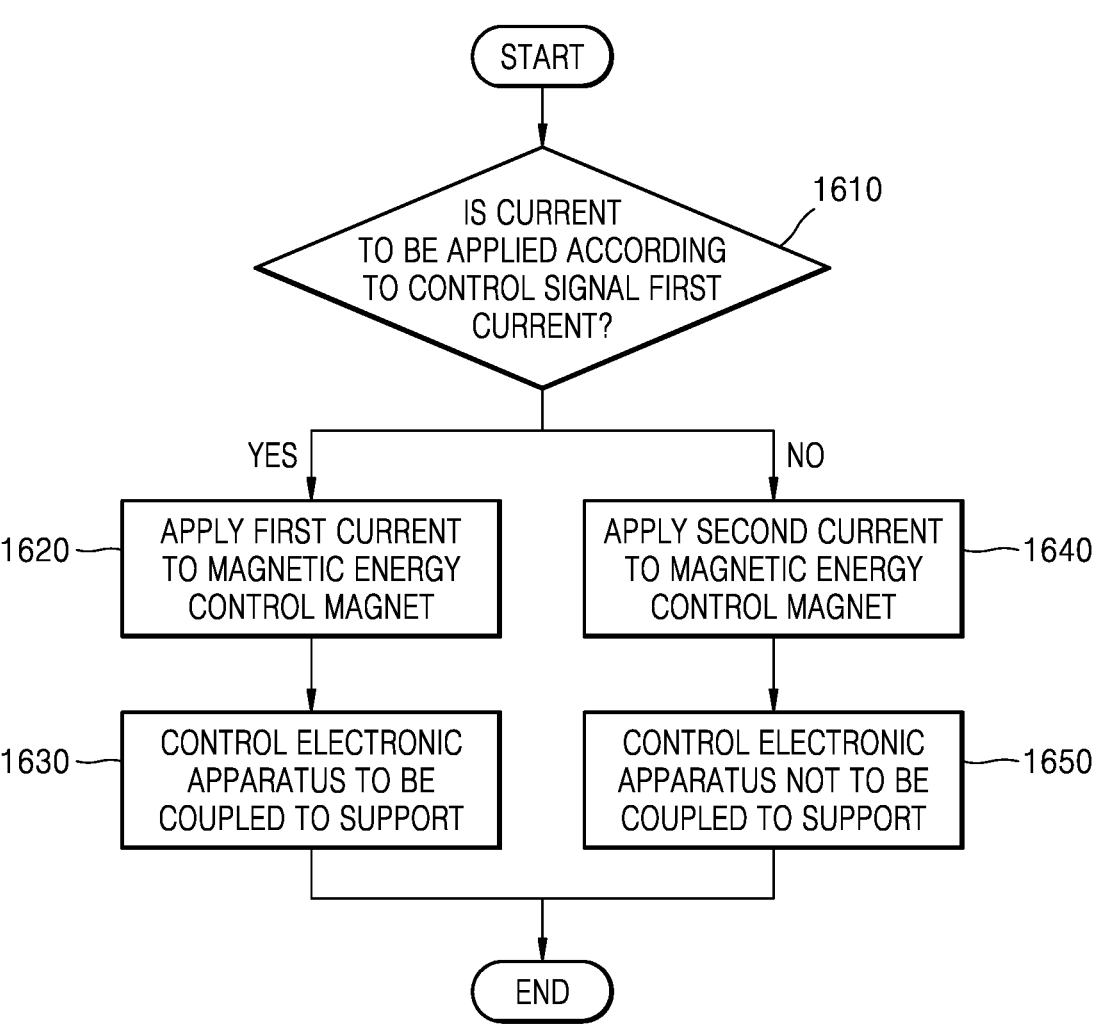
FIG. 16 is a flowchart illustrating a process in which an electronic apparatus applies a current according to a control signal to a magnetic energy control magnet, according to an embodiment.

FIG. 16 is a flowchart illustrating a process in which an electronic apparatus applies a current according to a control signal to a magnetic energy control magnet, according to an embodiment.

Referring to FIG. 16, the electronic apparatus may determine whether a current to be applied according to a control signal is a first current (operation 1610). The electronic apparatus may determine whether to supply the first current to a coupler or whether to supply a second current to the coupler, according to the control signal generated in response to a user input.

For example, when receiving a request for coupling between the electronic apparatus and a support from a user through a user input unit, the electronic apparatus may determine that the current to be supplied to the coupler is the first current.

When the current to be supplied is the first current, the electronic apparatus may apply the first current to a magnetic energy control magnet (operation 1620). When the coupler includes the magnetic energy control magnet, the electronic apparatus may directly apply the first current to the coupler to control a magnetic path of the magnetic energy control magnet. When the support other than the coupler includes the magnetic energy control magnet, the electronic apparatus may apply the first current to the magnetic energy control magnet through connectors included in the coupler and the support.

The electronic apparatus may control the electronic apparatus to be coupled to the support by applying the first current to the magnetic energy control magnet (operation 1630). The electronic apparatus may control the magnetic path of the magnetic energy control magnet to pass through a magnetic material by supplying the first current to the magnetic energy control magnet included in the coupler or the support corresponding to the coupler, such that the coupler is coupled to the support. Alternatively, the electronic apparatus may control the position of a physical fastener to be changed according to the magnetic path of the magnetic energy control magnet by supplying the first current to the magnetic energy control magnet, such that the coupler and the support are coupled with each other.

When the current to be supplied by the electronic apparatus is not the first current, the electronic apparatus may apply the second current to the magnetic energy control magnet (operation 1640). The electronic apparatus may apply the second current to the magnetic energy control magnet included in the coupler or the support corresponding to the coupler by applying the second current to the coupler.

The electronic apparatus may control the electronic apparatus not to be coupled to the support by applying the second current to the magnetic energy control magnet (operation 1650). The electronic apparatus may control the magnetic path of the magnetic energy control magnet not to pass through the magnetic material by supplying the second current to the magnetic energy control magnet included in the coupler or the support corresponding to the coupler, such that the coupler is not coupled to the support. Alternatively, the electronic apparatus may control the position of the physical fastener to be changed according to the magnetic path of the magnetic energy control magnet by supplying the second current to the magnetic energy control magnet, such that the coupler and the support are not coupled with each other.

Figure 17:
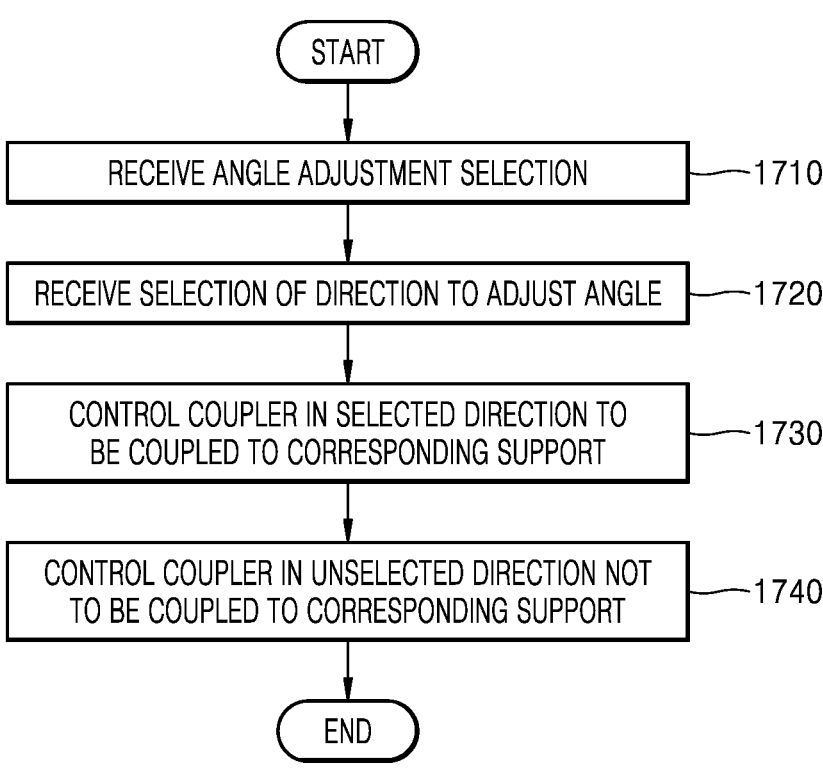
FIG. 17 is a flowchart illustrating a process in which the angle of an electronic apparatus is adjusted, according to an embodiment.

FIG. 17 is a flowchart illustrating a process in which the angle of an electronic apparatus is adjusted, according to an embodiment.

Referring to FIG. 17, the electronic apparatus may receive an angle adjustment selection (operation 1710). For example, the electronic apparatus may receive a user's selection with respect to an angle adjustment item of the electronic apparatus through an OSD item or the like.

In addition, the electronic apparatus may receive a user's selection with respect to a direction in which to adjust the angle (operation 1720).

For example, when two couplers are arranged in a horizontal direction in the electronic apparatus, the electronic apparatus may rotate in a rightward or leftward direction by allowing only one of the two couplers to be coupled to a support.

In another example, when the two couplers are arranged in a vertical direction in the electronic apparatus, the electronic apparatus may rotate in an upward or downward direction by allowing only one of the two couplers to be coupled to a support.

The electronic apparatus may control a coupler such that the coupler in the selected direction is coupled to a corresponding support (operation 1730). In addition, the electronic apparatus may control a coupler in an unselected direction not to be coupled to a corresponding support (operation 1740).

For example, when two couplers are arranged in the horizontal direction in the electronic apparatus, the user may select to rotate a display to the right with respect to a direction in which the user is looking at the display, through an interface screen or the like. The electronic apparatus may control a coupler located on the right to be coupled to a support located on the right and control a coupler located on the left not to be coupled to a support located on the left, according to the direction selected by the user. In this case, since the display of the electronic apparatus is coupled to the support by using only the right coupler, the display may be swiveled to the right by a predetermined angle and rotated.

For example, when the two couplers are arranged in the vertical direction in the electronic apparatus, the user may select to rotate the display to the left with respect to the direction in which the user is looking at the display, through the interface screen or the like. The electronic apparatus may control a coupler located at an upper side to be coupled to a support located at an upper side and control a coupler located at a lower side not to be coupled to a support located at a lower side. In this case, since the display of the electronic apparatus is coupled to the support by using only the upper coupler, the display may be tilted upward by a predetermined angle and rotated.

An electronic apparatus and an operating method thereof according to some embodiments may be implemented as a recording medium including instructions executable by a computer such as a program module. A computer-readable medium may be an arbitrary available medium accessible by a computer, and examples thereof include all volatile and non-volatile media and removable and non-removable media. In addition, examples of the computer-readable medium may include a computer storage medium and a communication medium. The computer storage medium includes all volatile/nonvolatile and removable/non-removable media implemented by a certain method or technology for storing information such as computer-readable instructions, a data structure, a program module, or other data. The communication medium generally includes computer-readable instructions, a data structure, a program module, other data of a modulated data signal such as a carrier wave, or another transmission mechanism, and examples thereof includes an arbitrary information transmission medium.

In addition, in the present specification, the term "unit" may be a hardware component such as a processor or a circuit and/or a software component executed by a hardware component such as a processor.

In addition, an electronic apparatus and an operating method thereof according to the embodiments of the disclosure may be implemented as a computer program product including a computer-readable recording medium having recorded thereon a program for executing the operating method performed by the electronic apparatus, the operating method including controlling a coupler located on a rear surface of the electronic apparatus to be coupled to a support for supporting the electronic apparatus or detached from the support by controlling a current applied to a magnetic energy control magnet included in one of the coupler and the support, wherein the controlling of the coupler to be coupled to or detached from the support includes allowing the coupler to be coupled to the support by applying a first current to the magnetic energy control magnet and allowing the coupler to be detached from the support by applying a second current to the magnetic energy control magnet.

While the disclosure has been particularly shown and described with reference to embodiments thereof, it will be understood by one of ordinary skill in the art that various changes in form and details may be made therein without departing from the spirit and scope of the present disclosure as defined by the following claims. Hence, it will be understood that the embodiments disclosed hereinbefore should be considered in descriptive sense only and not for purposes of limitation. For example, each element described as a single type may be executed in a distributed manner, and elements described as a distributed type may be executed in a combined type.

The invention claimed is:

1. An electronic apparatus comprising:
   a coupler, attachable to and detachable from a support, which is to support the electronic apparatus, the coupler being arrangeable on a rear surface of the electronic apparatus and one of the coupler and the support including a magnetic energy control magnet and another one of the coupler and the support including a magnetic material;
   a memory to store at least one instruction; and
   a processor configured to execute the at least one instruction stored in the memory to:
      control a direction of a closed magnetic path of a current applied to the magnetic energy control magnet included in one of the coupler and the support such that the coupler is attached to the support based on the direction of the closed magnetic path being through the magnetic material or the coupler is detached from the support based on the direction of the closed magnetic path not being through the magnetic material.

2. The electronic apparatus of claim 1, wherein the support includes the magnetic energy control magnet and a first connector,
   the coupler includes a second connector to be engaged with the first connector, and
   the electronic apparatus applies the current to the magnetic energy control magnet through the second connector and the first connector.

3. The electronic apparatus of claim 2, wherein the second connector senses whether the second connector is coupled with the first connector, and
   the processor is further configured to execute the at least one instruction to control the current applied to the magnetic energy control magnet based on the second connector sensing the second connector is coupled with the first connector.

4. The electronic apparatus of claim 1, further comprising:
   a display; and
   a user input unit,
   wherein the processor is further configured to execute the at least one instruction to:
      control the display to output an interface screen to control a signal generation,
      generate a control signal according to a user input, received through the user input unit, corresponding to the interface screen output, and
      control the direction of the closed magnetic path of the current applied to the magnetic energy control magnet according to the control signal.

5. The electronic apparatus of claim 1, wherein the coupler is a first coupler and the electronic apparatus includes a second coupler arrangeable on the rear surface of the electronic apparatus in one of a horizontal direction and a vertical direction with the first coupler,
   the first coupler and the second coupler respectively attachable to and detachable from a first support and a second support included in the support by using a first magnetic energy control magnet and a second magnetic energy control magnet, respectively, and the processor is further configured to execute the at least one instruction to control the direction of the closed magnetic path of the current applied to the first magnetic energy control magnet and a current applied to the second magnetic energy control magnet.

6. The electronic apparatus of claim 5, wherein one of the coupler and the support has a hinge structure, the electronic apparatus further comprises a user input unit, and the processor is further configured to execute the at least one instruction to control one of the first coupler and the second coupler to be attached to a corresponding support and control another one to be detached from a corresponding support according to a rotation direction of the electronic apparatus received through the user input unit.

7. The electronic apparatus of claim 1, wherein the coupler includes the magnetic energy control magnet and a first fastener that moves along the closed magnetic path of the magnetic energy control magnet, the support includes a second fastener to be coupled with the first fastener, and the processor is further configured to execute the at least one instruction to control a movement of the first fastener by using the current to be applied to the magnetic energy control magnet such that the coupler is attached to or detached from the support.

8. The electronic apparatus of claim 7, wherein the magnetic energy control magnet includes a permanent magnet, a first pole piece in contact with an N pole of the permanent magnet, and a second pole piece in contact with an S pole of the permanent magnet, the first fastener includes a first hook and a second hook, each including a magnetic material, and the first hook and the second hook are rotatably arranged at a lower end of the first pole piece and a lower end of the second pole piece, the second fastener includes a left fastener and a right fastener that are caught by the first hook and the second hook, respectively, provided the left fastener and the right fastener move to a left edge and a right edge, the processor is further configured to execute the at least one instruction to control the direction of the current applied to the magnetic energy control magnet to control the first fastener to be coupled to the second fastener or to be detached from the second fastener, and the controlling of the first fastener to be coupled to the second fastener or to be detached from the second fastener includes at least one of:

preventing the first hook and the second hook from being caught by the left fastener and the right fastener by preventing magnetic force from being formed at the lower end of the first pole piece and the lower end of the second pole piece; and allowing the first hook and the second hook to respectively move to the left edge and the right edge and be caught by the left fastener and the right fastener to be coupled to the support by allowing the magnetic force to be formed at the lower end of the first pole piece and the lower end of the second pole piece.

9. The electronic apparatus of claim 8, wherein the second pole piece is arranged apart from the first pole piece, the magnetic energy control magnet further includes a rotating magnet rotatably arranged between the first pole piece and the second pole piece, the processor is further configured to execute the at least one instruction to control the current applied to the magnetic energy control magnet to rotate the rotating magnet to control first fastener to be coupled to the second fastener or to be detached from the second fastener, and the controlling of the first fastener to be coupled to the second fastener or to be detached from the second fastener includes at least one of:

allowing the first hook and the second hook to be detached from the left fastener and the right fastener by preventing the magnetic force from being formed at the lower end of the first pole piece and the lower end of the second pole piece by allowing the first pole piece and an S pole of the rotating magnet to be magnetically connected and allowing the second pole piece and an N pole of the rotating magnet to be magnetically connected; and allowing the first hook and the second hook to be coupled to the left fastener and the right fastener by allowing the magnetic force to be formed at the lower end of the first pole piece and the lower end of the second pole piece by allowing the first pole piece and the N pole of the rotating magnet to be magnetically connected and allowing the second pole piece and the S pole of the rotating magnet to be magnetically connected.

10. An operating method performed by an electronic apparatus, comprising:

controlling a coupler, attachable to and detachable from a support that is to support the electronic apparatus, one of the coupler and the support including a magnetic energy control magnet and another one of the coupler and the support including a magnetic material, by controlling a direction of a closed magnetic path of a current to be applied to the magnetic energy control magnet included in the one of the coupler and the support, the coupler being arrangeable on a rear surface of the electronic apparatus, and the controlling of the coupler to be attached to or detached from the support includes at least one of:

allowing the coupler to be attached to the support based on the direction of the closed magnetic path being through the magnetic material; and allowing the coupler to be detached from the support based on the direction of the closed magnetic path not being through the magnetic material.

11. The operating method of claim 10, wherein the support includes the magnetic energy control magnet and a first connector, the coupler includes a second connector to be engaged with the first connector, and the method further comprises applying the current to the magnetic energy control magnet through the second connector and the first connector.

12. The operating method of claim 11, further comprising sensing whether the second connector and the first connector are coupled with each other, wherein the controlling of the coupler to be attached to or detached from the support comprises, based on the second connector and the first connector being coupled with each other, controlling the coupler to be attached to or detached from the support by controlling the direction of the closed magnetic path of the current applied to the magnetic energy control magnet.

13. A non-transitory computer-readable recording medium having recorded thereon a program to execute an operating method performed by an electronic apparatus, the operating method comprising:

controlling a coupler, attachable to and detachable from a support that is to support the electronic apparatus, by controlling a direction of a closed magnetic path of a current applied to a magnetic energy control magnet included in one of the coupler and the support and a magnetic material included in another one of the coupler and the support, and the controlling of the coupler to be attached to or detached from the support includes at least one of:

allowing the coupler to be attached to the support based on the direction of the closed magnetic path of being through the magnetic material; and allowing the coupler to be detached from the support based on the direction of the closed magnetic path of not being through the magnetic material.

\* \* \* \* \*